US009827739B2

(12) United States Patent
Rule et al.

(10) Patent No.: US 9,827,739 B2
(45) Date of Patent: Nov. 28, 2017

(54) HEAT DE-BONDABLE OPTICAL ARTICLES

(71) Applicant: 3M INNOVATIVE PROPERTIES COMPANY, St. Paul, MN (US)

(72) Inventors: Joseph D. Rule, Cottage Grove, MN (US); Scott M. Tapio, Falcon Heights, MN (US); Audrey S. Sherman, Woodbury, MN (US); Kevin R. Schaffer, Woodbury, MN (US); Lan H. Liu, Rosemount, MN (US); Margot A. Branigan, Roseville, MN (US); Ross E. Behling, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 493 days.

(21) Appl. No.: 14/416,852

(22) PCT Filed: Jul. 1, 2013

(86) PCT No.: PCT/US2013/048927
§ 371 (c)(1),
(2) Date: Jan. 23, 2015

(87) PCT Pub. No.: WO2014/018231
PCT Pub. Date: Jan. 30, 2014

(65) Prior Publication Data
US 2015/0273796 A1 Oct. 1, 2015

Related U.S. Application Data

(60) Provisional application No. 61/675,880, filed on Jul. 26, 2012.

(51) Int. Cl.
*B32B 7/06* (2006.01)
*C09J 5/06* (2006.01)
(Continued)

(52) U.S. Cl.
CPC ........... *B32B 7/06* (2013.01); *B32B 17/06* (2013.01); *B32B 37/1284* (2013.01);
(Continued)

(58) Field of Classification Search
CPC ........................................ B32B 7/06
See application file for complete search history.

(56) References Cited

U.S. PATENT DOCUMENTS 2,532,011 A 11/1950 Dalquist
2,736,721 A 2/1956 Dexter
(Continued)

FOREIGN PATENT DOCUMENTS

EP 1130070 9/2001
JP H08-248887 9/1996
(Continued)

OTHER PUBLICATIONS

Hussein, "New Technologies for active disassembly: Using the Shape Memory Effect in Engineering Polymers", Int. J. Product Development, 2008, vol. 6, No. 3/4, pp. 431-449.
(Continued)

*Primary Examiner* — Jeff Aftergut
(74) *Attorney, Agent, or Firm* — Jeffrey M. Olofson

(57) ABSTRACT

Heat de-bondable optical articles include two optical substrates and a heat de-bondable adhesive article disposed between them. The adhesive article includes a heat-shrinkable substrate and an optically clear adhesive proximate to the heat-shrinkable substrate. Optical articles can be prepared by disposing the heat-shrinkable substrate and the optically clear adhesive between two optical substrates. The optically clear adhesive covers a majority of the surface area of the optical substrates, and the heat-shrinkable substrate is located near the edge of the optical substrates.

21 Claims, 2 Drawing Sheets

(51) Int. Cl.
*B32B 17/06* (2006.01)
*B32B 37/12* (2006.01)
*B32B 37/18* (2006.01)
*B32B 38/00* (2006.01)
*B32B 38/10* (2006.01)

(52) U.S. Cl.
CPC .......... *B32B 37/18* (2013.01); *B32B 38/0036* (2013.01); *B32B 38/10* (2013.01); *C09J 5/06* (2013.01); *B32B 2037/1253* (2013.01); *B32B 2307/31* (2013.01); *B32B 2307/412* (2013.01); *B32B 2551/00* (2013.01); *C09J 2205/302* (2013.01); *Y10T 156/10* (2015.01); *Y10T 428/24843* (2015.01)

(56) References Cited

U.S. PATENT DOCUMENTS

| | | | |
|---|---|---|---|
| RE24,906 E | 12/1960 | Ulrich | |
| 3,437,622 A | 4/1969 | Dahl | |
| 3,718,712 A | 2/1973 | Tushaus | |
| 3,841,890 A | 10/1974 | Coaker | |
| 4,144,217 A | 3/1979 | Snelgrove | |
| 4,436,858 A | 3/1984 | Klosiewicz | |
| 4,629,663 A | 12/1986 | Brown | |
| 4,637,950 A | 1/1987 | Bergeson | |
| 4,816,333 A | 3/1989 | Lange | |
| 5,139,832 A | 8/1992 | Hayashi | |
| 5,145,935 A | 9/1992 | Hayashi | |
| 5,155,199 A | 10/1992 | Hayashi | |
| 5,209,971 A | 5/1993 | Babu | |
| 5,214,119 A | 5/1993 | Leir | |
| 5,223,465 A | 6/1993 | Ueki | |
| 5,290,615 A | 3/1994 | Tushaus | |
| RE34,605 E | 5/1994 | Schrenk | |
| 5,360,659 A | 11/1994 | Arends | |
| 5,441,810 A | 8/1995 | Aizawa | |
| 5,506,300 A | 4/1996 | Ward | |
| 5,579,162 A | 11/1996 | Bjornard | |
| 5,585,186 A | 12/1996 | Scholz | |
| 5,589,246 A | 12/1996 | Calhoun | |
| 5,591,820 A | 1/1997 | Kydonieus | |
| 5,611,969 A * | 3/1997 | Cano | B29C 33/0038 249/155 |
| 5,665,822 A | 9/1997 | Bitler | |
| 5,753,346 A | 5/1998 | Leir | |
| 5,753,373 A | 5/1998 | Scholz | |
| 5,873,931 A | 2/1999 | Scholz | |
| 5,882,774 A | 3/1999 | Jonza | |
| 5,888,650 A | 3/1999 | Calhoun | |
| 6,049,419 A | 4/2000 | Wheatley | |
| 6,060,159 A | 5/2000 | Delgado | |
| 6,160,084 A | 12/2000 | Langer | |
| 6,204,350 B1 | 3/2001 | Liu | |
| 6,273,791 B1 | 8/2001 | Kataoka | |
| 6,388,043 B1 | 5/2002 | Langer | |
| 6,423,421 B1 | 7/2002 | Banaszak | |
| 6,444,076 B1 | 9/2002 | Herndon | |
| 6,649,017 B1 | 11/2003 | Kurokawa | |
| 6,660,354 B2 | 12/2003 | Suwa | |
| 6,773,535 B1 | 8/2004 | Wetzel | |
| 7,063,765 B2 | 6/2006 | Kudo | |
| 7,078,093 B2 | 7/2006 | Sheridan | |
| 7,173,096 B2 | 2/2007 | Mather | |
| 7,229,687 B2 | 6/2007 | Kinning | |
| 7,374,812 B2 | 5/2008 | Mizuno | |
| 7,411,020 B2 | 8/2008 | Carlson | |
| 7,927,533 B2 | 4/2011 | Kamiya | |
| 8,124,169 B2 | 2/2012 | Ylitalo | |
| 8,592,034 B2 | 11/2013 | Rule | |
| 8,742,022 B2 | 6/2014 | Pokorny | |
| 2005/0073747 A1 | 4/2005 | Suzudo | |
| 2005/0244353 A1 | 11/2005 | Lendlein | |
| 2006/0041089 A1 | 2/2006 | Mather | |
| 2007/0009465 A1 | 1/2007 | Lendlein | |
| 2007/0074822 A1 | 4/2007 | Akechi | |
| 2007/0297736 A1 | 12/2007 | Sherman | |
| 2008/0121335 A1 | 5/2008 | Kiuchi | |
| 2008/0131634 A1 | 6/2008 | Kiuchi | |
| 2009/0053478 A1 | 2/2009 | Sakashita | |
| 2009/0215351 A1 | 8/2009 | Kobayashi | |
| 2009/0229732 A1 | 9/2009 | Determan | |
| 2009/0229766 A1 | 9/2009 | Aveldson | |
| 2010/0048804 A1 | 2/2010 | Determan | |
| 2010/0252185 A1 | 10/2010 | Kiuchi | |
| 2010/0258346 A1 | 10/2010 | Chen | |
| 2010/0279491 A1 | 11/2010 | Kiuchi | |
| 2010/0316845 A1 | 12/2010 | Rule | |
| 2011/0123800 A1 | 5/2011 | Sherman | |
| 2011/0195248 A1 | 8/2011 | Kiuchi | |
| 2011/0281045 A1 | 11/2011 | Goubard | |
| 2012/0100326 A1 | 4/2012 | Sherman | |
| 2012/0270980 A1 | 10/2012 | Pokorny | |
| 2013/0029147 A1 | 1/2013 | Miki | |

FOREIGN PATENT DOCUMENTS

| | | |
|---|---|---|
| JP | H10-60391 | 3/1998 |
| JP | 2000-204332 | 7/2000 |
| JP | 2002-511974 | 4/2002 |
| KR | 2001-0067149 | 7/2001 |
| WO | WO 98-55280 | 10/1998 |
| WO | WO 00-40648 | 7/2000 |
| WO | WO 00-75210 | 12/2000 |
| WO | WO 2009-085662 | 7/2009 |
| WO | WO 2009-089137 | 7/2009 |
| WO | WO 2009-105297 | 8/2009 |
| WO | WO 2009-114683 | 9/2009 |
| WO | WO 2011-119828 | 9/2011 |
| WO | WO 2012-024217 | 2/2012 |
| WO | WO 2012-036980 | 3/2012 |
| WO | WO 2013-012973 | 1/2013 |
| WO | WO 2014-018312 | 1/2014 |

OTHER PUBLICATIONS

Bragg, "The form birefringence of macromolecules", Acta Crystallographica, Nov. 1953, vol. 6, No. 11-12, pp. 865-867.

International Search report for PCT International Application No. PCT/US2013/048927 dated Sep. 26, 2013, 3 pages.

\* cited by examiner

HEAT DE-BONDABLE OPTICAL ARTICLES

CROSS REFERENCE TO RELATED APPLICATIONS

This application is a national stage filing under 35 U.S.C. 371 of PCT/US2013/048927, filed Jul. 1, 2013, which claims priority to U.S. Provisional Application No. 61/675880, filed Jul. 26, 2012, the disclosure of which is incorporated by reference in its/their entirety herein.

FIELD OF THE DISCLOSURE

This disclosure relates to optical articles that can contain adhesive bonds that can be de-bonded by heat.

BACKGROUND

Adhesives have been used for a variety of marking, holding, protecting, sealing and masking purposes. Adhesive tapes generally comprise a backing, or substrate, and an adhesive. One type of adhesive, a pressure sensitive adhesive (PSA) is particularly preferred for many applications.

PSAs are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs are polymers designed and formulated to exhibit the requisite viscoelastic properties resulting in a desired balance of tack, peel adhesion, and shear strength. The most commonly used polymers for preparation of PSAs are natural rubber, synthetic rubbers (e.g., styrene/butadiene copolymers (SBR) and styrene/isoprene/styrene (SIS) block copolymers), and various (meth) acrylate (e.g., acrylate and methacrylate) copolymers. With the exception of several (meth)acrylates, which are inherently tacky, these polymers are typically blended with appropriate tackifying resins to render them pressure sensitive.

A variety of adhesive articles have been described that are heat-responsive. By this it is meant that upon the application of heat to an adhesive article a response is generated. In some articles the response is to form a bond, in other instances it is to break a bond. In general four types of such articles have been described. The first group are ones in which the application of heat to an adhesive article is applied to form a bond. The second group of references is so called processing tapes, where a tape is applied to a substrate for one or more processing steps and then removed. The third group includes references to adhesive articles where an additive is present in the adhesive that is thermally responsive. The fourth group includes articles that contain heat responsive materials, either polymeric materials or metallic materials.

An example of the first group is EP Patent Publication No. 1,130,070 which describes thermally shrinkable films or labels for containers where the labels or films are affixed by the process of a) coating the thermally shrinkable film or label with a radiation curable adhesive, b) applying the film or label to the container, c) radiation curing the adhesive, and d) heating the container to shrink the film or label to permanently affix it to the container.

Examples of the second group, processing tapes, include a series of US Patent Publication Nos. 2008/0131634, 2010/0252185, and 2010/0279491 (all to Kiuchi et al.). These references describe adhesive coated sheets and tapes that are self-rolling. The sheets or tapes include a shrinkable film layer which upon shrinking rolls upon itself causing a peeling release from substrates to which the sheet or tape are adhered. U.S. Pat. No. 7,063,765 (Kudo et al.) describes a processing tape for wafer dicing in which adhesive layers are present in which the adhesion of the adhesive layers can be reduced by a chemical reaction. A method of processing a wafer article that includes a sheet containing sequentially, a first substrate, a first adhesive layer, a second substrate, and a second adhesive layer is described where the sheet is affixed to a wafer, the wafer is diced, the first substrate and first adhesive layer are removed by reducing the adhesion of the first adhesive layer, the wafer is divided into a plurality of chips and the second substrate and second adhesive layer are removed by reducing the adhesion of the second adhesive layer. PCT Publication No. WO 98/55280 describes a veneer tape that can be used to maintain a plurality of wood veneer substrates in fixed relation to each before and during a lamination process and is cleanly removable from the substrates following the lamination process. The tape backing may include a heat-shrinkable film.

Examples of the third group of adhesive articles where the adhesives contain heat responsive additives include US Patent Publication No. 2009/0053478 (Sakashita) which describes a functional film formed on a film formation substrate. The method of making the functional film includes: a) forming an electromagnetic wave absorbing layer on the substrate; b) forming a separation layer on the electromagnetic wave absorbing layer by using an inorganic material that forms a gas upon heating; c) forming a layer to be peeled containing a functional film; and d) applying electromagnetic wave to electromagnetic wave absorbing layer to reduce the bonding strength between the layer to be peeled and the substrate. Another example is PCT Publication No. WO 00/40648 which describes a heat debondable adhesive composition. The heat debondable adhesive compositions comprises a curable resin and a heat expandable inorganic material.

Examples of the fourth group of adhesive articles include materials that are heat responsive. US Patent Publication No. 2011/0281045 (Goubard, et al.) describes multilayer articles such as labels that include a hot melt pressure sensitive adhesive layer, a printable support layer, which may comprise a heat-shrinkable material, and a protective layer. The labels are removable by immersing in hot basic aqueous solutions. U.S. Pat. No. 5,441,810 (Aizawa et al.) describes an adhesive sheet comprising a substrate with a rubber-like elastic layer, a heat-expandable layer, and an adhesive layer. Some of the heat responsive articles include materials that are described as shape memory polymers. Shape memory polymers are materials that are formed in one shape, deformed to a second shape, and revert to their original shape upon the application of heat. U.S. Pat. No. 5,888,650 (Calhoun et al.) describes temperature-responsive adhesive articles with: a) a temperature-responsive carrier; and b) a thermomorphic pressure sensitive adhesive coated on at least a portion of the carrier. The articles have a wide range of bonding and de-bonding properties. U.S. Pat. No. 6,773,535 (Wetzel) describes a separable bonding system including two opposed rigid adherends and deformed shape memory alloy element disposed between and adhesively bonded to facing surfaces of the two rigid adherends. The shape memory alloy member is mechanically strained to form a deformed shape memory alloy member. The temperature is elevated sufficient to transform the deformed shape memory alloy member to a recovered shape, thereby weakening the adhesive bonds to the two rigid adherends.

US Patent Publication No. 2010/0316845 (Rule et al.) describes adhesive articles that contain shape memory polymer backings and are debondable from substrates or adherends with the application of heat. U.S. Patent Application Ser. No. 61/509,250, filed Jul. 19, 2011 with the title "DEBONDABLE ADHESIVE ARTICLE AND METHODS OF MAKING AND USING THE SAME" describes debondable adhesive articles including adhesive layers on opposing sides of shape-memory polymer sheet that includes a plurality of slits therein. The article can be debonded by heating the article to a temperature equal to or greater than a transition temperature for the shape-memory polymer sheet.

SUMMARY

Disclosed herein are heat de-bondable adhesive articles, optical articles made from these heat de-bondable adhesive articles and methods to make and heat de-bond optical articles.

In some embodiments, the articles comprise a first optical substrate with a first major surface, a second major surface, and at least one edge, a second optical substrate with a first major surface and a second major surface and at least one edge, and an adhesive article disposed between the first optical substrate and the second optical substrate. The adhesive article comprises a first optically clear adhesive with a first major surface and a second major surface, and a heat-shrinkable substrate with a first major surface and a second major surface, where the heat-shrinkable substrate is proximate to the first optically clear adhesive, and also is proximate to the edge of the second major surface of the first optical substrate and is proximate to the edge of the first major surface of the second optical substrate. The first major surface of the first optically clear adhesive is disposed on the second major surface of the first optical substrate such that the first optically clear adhesive is disposed on a majority of the surface area of the second major surface of the first optical substrate, and is disposed on the first major surface of the second optical substrate such that the first optically clear adhesive is disposed on a majority of the surface area of the first major surface of the second optical substrate. The first optically clear adhesive has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising the first optically clear adhesive and the heat-shrinkable substrate. The heat-shrinkable substrate is not disposed on a majority of the surface area of either the first optical substrate or the second optical substrate. At least part of the heat-shrinkable substrate has a threshold shrink force of at least 100 grams per inch (3.85 N/dm).

Also described are methods of preparing and using optical articles. In some embodiments, the method comprises preparing a multi-layer article. Preparing the multi-layer article comprises providing a first optical substrate having a first major surface and a second major surface and at least one edge, providing a second optical substrate having a first major surface and a second major surface and at least one edge, forming an adhesive article on the second major surface of the first optical substrate, and disposing the second optical substrate on the adhesive article. Forming the adhesive article comprises disposing a heat-shrinkable substrate on the second major surface of the first optical substrate proximate to the edge of the first optical substrate, and disposing a first optically clear adhesive on the majority of the surface area of the second major surface of the first optical substrate and proximate to the heat-shrinkable substrate, such that the first optically clear adhesive forms an adhesive bond to the first optical substrate. The heat-shrinkable substrate has a first major surface and a second major surface and threshold shrink force of at least 100 grams per inch (3.85 N/dm). The first optically clear adhesive has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising the second or third adhesive and the heat-shrinkable substrate. The second optical substrate is disposed on the adhesive article such that the edge of the second major substrate is proximate to the second major surface of the heat-shrinkable substrate, and the first optically clear adhesive is disposed on the majority of the surface area of the first major surface of the second optical substrate, such that the first optically clear adhesive forms an adhesive bond to the second optical substrate. In some embodiments, the method further comprises applying heat to the prepared multi-layer article sufficient to induce shrinkage in the heat-shrinkable substrate. In some embodiments, this shrinkage causes failure of the adhesive bond of the first optically clear adhesive to the first optical substrate, failure of the adhesive bond of the first optically clear adhesive to the second optical substrate, or failure of both adhesive bonds.

BRIEF DESCRIPTION OF THE DRAWINGS

The present application may be more completely understood in consideration of the following detailed description of various embodiments of the disclosure in connection with the accompanying drawings.

Figure 1:
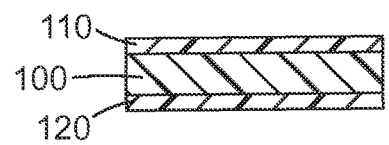
FIG. 1 shows a cross sectional view of a heat-shrinkable article according to one embodiment of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Typically, adhesive articles comprise two adherends which are adhesively bonded by a layer of adhesive. The adherends can be a wide variety of substrates including films, plates, surfaces of articles, walls, floors, windows, and the like. The adherends can be flexible, rigid, semi-rigid, continuous or discontinuous. Similarly, the adhesive layer can be a pressure sensitive adhesive layer, a curable adhesive layer, or the like and can be relatively thick or thin and continuous or discontinuous.

Traditionally, the adhesive layer was utilized solely to form the adhesive bond between the two adherends. In these instances, the typical adhesive properties of tack, peel adhesion, and shear strength were the key parameters for these adhesives. However, the use of adhesives, especially pressure sensitive adhesives, in areas such as the medical, electronic and optical industries is increasing. The requirements of these industries place additional demands upon the pressure sensitive adhesive beyond the traditional properties of tack, peel adhesion and shear strength. For example, the optical industry places optical clarity and stability requirements (such as being non-yellowing over time and upon temperature exposure) upon the adhesive layer, especially if the adhesive layer is in the optical pathway. A variety of adhesives have been developed to address these increasing property requirements. Generally these efforts have led to adhesives that form very strong adhesive bonds to a wide variety of substrates.

While much effort has been expended in the development of adhesives that provide stronger adhesive bonds, bonds to a wider range of substrates, and that have a variety of additional properties such as weatherability, optical clarity, etc, comparatively little effort has been spent on the development of de-bondable adhesives. Many of the advantageous features of adhesives that provide strong and durable adhesive bonds, can also make it difficult and costly to take apart these bonds. Since adhesives are designed to effectively bond adherends to each other, in instances where it is desired to take apart the adhesive bond, for example to replace or repair an adhesively bonded adherend, the adhesive naturally resists this removal. Non-rigid adherends can often be removed by peeling the adherend from the adhesive or by peeling the adherend/adhesive layer from the adherend to which they are bonded. However, with rigid or semi-rigid adherend substrates, this removal by peel mechanisms is thwarted. Consider, for example, a typical panel of safety glass. In many instances this relatively simple optically clear article is actually a multi-layer article that includes two panes of glass, two layers of optically clear adhesive, and an optically clear film. Typically the article has the configuration: glass/adhesive/film/adhesive/glass. If this article needs to be taken apart for repairs or replacement of one or more of the substrates, there is no way to peel the glass substrates away from the adhesive or to peel the adhesive/glass article away from the film. This difficulty results regardless of the adhesive strength of the adhesive layers, since the overall article resists peeling. An example of this effect has been observed by any student who has placed a drop of water between two microscope slides in, for example, a biology class. Attempts to peel apart the two slides even though they are only held together by the surface tension of the water are generally fruitless and the slides have to be slid apart (a shear force). This effect is much stronger when adhesives are used to adhere together two rigid or semi-rigid substrates.

Therefore, adhesive articles that are heat de-bondable, are desirable. The term "heat de-bondable" as used herein refers to adhesive articles that upon the application of heat undergo a change in the adhesive bond such that one or both of the adherends can be removed from the adhesive layer. A heat de-bondable adhesive layer permits the adhesive layer to have a useful lifespan holding together adherends and also permits the removal of adherends to allow recycling or repairing of adhered substrates upon damage or at the end of the useful life of the article.

In this disclosure, adhesive articles are presented that can be placed within constructions, especially optical constructions, and while being present over only a small portion of the construction can impart to these constructions heat de-bondability. The adhesive articles utilize the combination of a heat-shrinkable substrate and a proximate adhesive layer or adhesive layers with the desired properties to achieve heat de-bondable articles. Additionally, there may be one or more adhesive layers present on the heat-shrinkable substrate to adhere the heat-shrinkable substrate to the other components of the construction. In these articles, the shrink force of the heat-shrinkable substrate provides the heat de-bonding force for the construction.

An added advantage of the heat de-bondable articles of this disclosure is that by using a heat-shrinkable substrate to induce the de-bonding, heating causes a permanent change in the article. In other words, once the article has been heated and the heat-shrinkable substrate has shrunk, the article does not go back to its pre-heated state upon cooling. This permits the article to be heated, for example in an oven, and then to be cooled and dismantled. The article does not have to be dismantled hot. This is in contrast to, for example, systems where the adhesive layers are thermally sensitive and lose their adhesive strength upon heating, but regain their adhesive strength upon cooling. Articles with this type of adhesive system would have to be dismantled while hot. Dismantling articles while hot is not only inconvenient and potentially dangerous to those doing the dismantling, it may not even be possible. For example, if the articles are placed on a conveyor belt and passed through an oven, it may not be possible to access the articles and dismantle them before they have cooled. In contrast, the articles of this disclosure can generally be heat de-bonded and then dismantled after cooling.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are heat activated adhesives and pressure sensitive adhesives.

Heat activated adhesives are non-tacky at room temperature but become tacky and capable of bonding to a substrate at elevated temperatures. These adhesives usually have a Tg (glass transition temperature) or melting point (Tm) above room temperature. When the temperature is elevated above the Tg or Tm, the storage modulus usually decreases and the adhesive becomes tacky. Typically glass transition temperature (Tg) is measured using Differentially Scanning calorimetry (DSC).

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, —$CH_2CH_2(OCH_2CH_2)$—$OCH_2CH_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —$R^a$—$Ar^a$— where $R^a$ is an alkylene and $Ar^a$ is an arylene (i.e., an alkylene is bonded to an arylene).

The term "(meth)acrylate" refers to monomeric acrylic or methacrylic esters of alcohols. Acrylate and methacrylate monomers are referred to collectively herein as "(meth)acrylate" monomers.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically clear" refers to an adhesive or article that has a high light transmittance over at least a portion of the visible light spectrum (about 400 to about 700 nm), and that exhibits low haze. Optically clear adhesives and articles generally have greater than 90% transmittance of visible light and haze values of 5% or less.

As used herein, the term "proximate" means near to. Articles or layers that are proximate may be touching or there may be a small void space between them.

Disclosed herein are constructions comprising a first optical substrate with a first major surface, a second major surface, and at least one edge, a second optical substrate with a first major surface and a second major surface and at least one edge, and an adhesive article between the first optical substrate and the second optical substrate. As used herein, the term "optical substrate" refers to a substrate that can be used to produce an optical effect. The substrate can be rigid, semi-rigid or flexible. The substrate can be any suitable thickness. The optical substrates often are at least partially transmissive, reflective, antireflective, polarizing, optically clear, or diffusive with respect to some wavelengths of the electromagnetic spectrum (e.g., wavelengths in the visible, ultraviolet, or infrared regions of the electromagnetic spectrum). Exemplary optical substrates include, but are not limited to, plates, sheets, the surfaces of optical articles, and films. Examples of suitable optical substrates are described in greater detail below. Typically at least one of the optical substrates is optically transparent or optically clear.

The adhesive article comprises two separate components: a first optically clear adhesive; and a heat-shrinkable substrate. The first optically clear adhesive has a first major surface and a second major surface. The first major surface of the first optically clear adhesive is disposed on the second major surface of the first optical substrate and the second major surface of the optically clear adhesive is disposed on the first major surface of the second optical substrate. The first optically clear adhesive layer is disposed on a majority of the surface area of the first major surface of the first and second optical substrates. The heat-shrinkable substrate is proximate to the adhesive layer and has a first major surface and a second major surface, such that the first major surface of the heat-shrinkable substrate is proximate to the edge of the second major surface of the first optical substrate and the second major surface of the heat-shrinkable substrate is proximate to the edge of the first major surface of the second optical substrate. Heat-shrinkable substrates are substrates that are responsive to the application of heat, and may be considered a subset of the broader class of shape memory polymers. At least part of the heat-shrinkable substrate has a threshold shrink force of at least 100 grams per inch (3.85 N/dm). The first optically clear adhesive has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising the adhesive layer and the heat-shrinkable substrate. The threshold shrink force and Failure Force are described in more detail below as well as in the co-pending patent application titled "HEAT DE-BONDABLE ADHESIVE ARTICLES" filed on the same date as the present disclosure. The adhesive articles may also comprise a second adhesive disposed on the first major surface of the heat-shrinkable substrate and a third adhesive disposed on the second major surface of the heat-shrinkable substrate. These adhesives are optional and are present to aid in adhering the heat-shrinkable substrate to the optical substrates.

In this disclosure are presented adhesive articles that are two component articles that comprise a heat-shrinkable substrate with a first major surface and a second major surface, and an optically clear adhesive with a first major surface and a second major surface. The optically clear adhesive is disposed proximate to the heat-shrinkable substrate. The optically clear adhesive adheres together the first and second optical substrates. The heat-shrinkable substrate is located at an edge of the optical substrates. This is desirable for a variety of reasons. Because the heat-shrinkable substrate is located between the optically clear adhesive and the outside environment, it can act as a dam or barrier to prevent the adhesive from flowing or oozing out from between the optical substrates. This is particularly true if the adhesive is a curable liquid as will be described below in more detail. Additionally, having a non-tacky barrier on the edge of the optical article can be desirable to avoid the edge from picking up dirt or other contamination and to give it a non-tacky feel if touched. The primary reason for the heat-shrinkable substrate to be located on the edge of the optical substrates, is that when the optical constructions are heated to induce heat de-bonding, the heat-shrinkable substrates on the edge of the constructions can act as a wedge to help lever apart the optical substrates. Once failure of the adhesive bonding of the article is started on the edge, a peel mechanism can be used to take apart the construction. If the heat-shrinkable substrate were not there, merely heating the construction would not start this peel mechanism. Additionally, the heat-shrinkage of the heat-shrinkable substrate causes a permanent change in the construction. Thus the wedge effect caused by the heat-shrinkage of the heat-shrinkable film remains after the construction has cooled, it does not revert to its original state. This permits the construction to be taken apart after cooling. If the heating were used to simply weaken the adhesive bonds, the construction would have to be taken apart while hot, otherwise the adhesive bonds can reform upon cooling. Taking apart the construction while hot, if even possible, can be inconvenient, dangerous, and messy.

The heat-shrinkable substrate may be simply disposed between the first and second optical substrate, or the adhesive article may optionally comprise a second and a third adhesive. The second and third adhesives are disposed on the first and second major surfaces of the heat-shrinkable substrate. These adhesives assist in adhering the heat-shrinkable substrate to the optical substrates. The second and third adhesive may be the same or different, and either or both may be same as the first adhesive. The second and third adhesives, if present, have the same Failure Force (described below) as the optically clear adhesive.

All of the elements of the adhesive article (heat-shrinkable substrate, first adhesive, and optional second and third adhesive), cooperate to make the constructions heat de-bondable. The shrink force of the heat-shrinkable substrate, together with the appropriate choice of adhesives (described below) with a desired Failure Force for the adhesive, provides heat de-bondable adhesive bonds. While not wishing to be bound by theory, it is believed that it is the combination of forces (shrink force and Failure Force) cooperating that provides the heat de-bonding.

A variety of different heat-shrinkable optical substrates are suitable for use in the adhesive articles of this disclosure. The heat-shrinkable substrate may be a single layer substrate or a multi-layer substrate. At least part of the heat-shrinkable substrate has a threshold shrink force. The threshold shrink force refers to the minimum shrink force suitable to give the desired heat de-bonding effect. The shrink force is the maximum force per unit width developed by a film during a temperature ramp through the film's glass transition temperature or melting temperature while the film is under restraint. The measurement is performed with the film in the machine orientation and the transverse orientation, and the greater of the two values is the shrink force. Suitable heat-shrinkable substrates have a threshold shrink force of at least about 100 grams per inch (3.85 N/dm). In some embodiments, the threshold shrink force is about 100 to about 500 grams per inch (3.85-19.3 N/dm) or 130 to about 440 grams per inch (5.20-16.9 N/dm), or even 135 to about 430 grams per inch (5.20-16.6 N/dm).

As described above, the shrink force of the heat-shrinkable substrate cooperates with the Failure Force of the adhesive layer to provide the heat de-bondable adhesive bonds. Typically, the heat-shrinkable substrate has been heated and stretched or elongated. This stretched substrate, upon the application of heat, relaxes toward the pre-stretched state to release the energy imparted to the substrate by stretching. It is this release of energy that provides the shrink force for the substrate. Additionally, as the heat-shrinkable substrate shrinks in length and or width, it generally grows in thickness to maintain an approximately constant volume. This growth in thickness provides the wedging action described above that helps to force apart the optical substrates.

Another way to characterize the shrink force is the reduction in the area of the heat-shrinkable substrate upon heating, in other words, comparing the area of the heat-shrinkable substrate before and after heating. In some embodiments, the heat-shrinkable substrate has an initial area at ambient temperature and shrinks to no greater than 80% of the initial area upon exposure to 150° C. for 30 minutes.

Because the heat-shrinkable substrates are used with optical substrates, it may be desirable that the heat-shrinkable substrate be optically clear. However, one advantage of the heat-shrinkable substrates of this disclosure is that they are often not in the optical path of the light passing through the optical substrates, and therefore need not be optically clear. The heat-shrinkable substrates are often not in the optical path since the heat-shrinkable substrates are located at the edge of the substrates. However, for aesthetic or other reasons it may be desirable that the heat-shrinkable substrate be optically transparent or optically clear. Examples of suitable optically clear heat-shrinkable substrates include a wide variety of optically clear heat-shrinkable films. Among the suitable optically clear heat-shrinkable films are the so-called "shrink films" or "shrink wraps". Shrink films are polymeric films that are designed to be wrapped around an article to be covered, and upon the application of heat, the film shrinks to tightly fit over the covered article.

The shrink film can be designed to shrink in one direction (unidirectional or monodirectional) or in both directions (bidirectional) depending upon how it is prepared. Generally, heat shrink films are stretched when they are warm to orient the molecules from their initial random pattern. Cooling the film sets the film's characteristics until it is reheated to a sufficient temperature that causes it to shrink back toward its initial dimensions.

Examples of suitable shrink films are a polyolefin film, a poly(meth)acrylate film, a polyester film, a polystyrene film, a polycarbonate film, a vinyl film, a cellulose-based film (such as cellulose triacetate films), or a blend film. Blend films include films that are composed on one or more of the above materials in a blend, such as a film prepared from a blend of polyolefin and polyester materials. In some embodiments, polyolefin films and poly(meth)acrylate films are particularly suitable. Examples of commercially available films that are particularly suitable are presented in the Examples section below.

Another example of a class of heat-shrinkable films that are not optically clear, but are suitable for use in articles of this disclosure are the shape-memory polymer sheets with a plurality of slits, described in U.S. Patent Application Ser. No. 61/509,250, filed Jul. 19, 2011 with the title "DEBONDABLE ADHESIVE ARTICLE AND METHODS OF MAKING AND USING THE SAME". Additionally, the shape-memory materials described may also be suitable without the plurality of slits. When a shape-memory material is initially formed it adopts an intrinsic shape. If the shape-memory material is then heated at or above a transition temperature ($T_{trans}$) it softens and will deform in response to an applied external stress. If the shape-memory material is cooled in this state, it will retain its strained temporary shape indefinitely. If the strained shape-memory material is reheated to a sufficiently high temperature, higher than the shape-memory transition temperature, the strained shape-memory material returns to its intrinsic shape.

Some polymeric materials are shape-memory materials. For convenience, such polymeric shape-memory materials will be referred to hereinafter as shape-memory polymers (SMPs). The mechanism behind SMPs lies in their molecular network structure, which typically contains physical or chemical crosslinks. In some cases, the physical crosslinks are formed by at least two separate phases. One phase with the highest thermal transition, $T_{upper}$, determines the temperature that must be exceeded to reestablish physical crosslinks responsible for the intrinsic shape. A second phase includes switching segments with the ability to soften above a certain transition temperature ($T_{trans}$) and is responsible for the temporary shape. In some cases, $T_{trans}$ is near the glass transition temperature ($T_g$), and in other cases it is near the melting temperature ($T_m$) of the SMP. Exceeding $T_{trans}$ (while remaining below $T_{upper}$) softens the switching segments, allowing the SMP to resume its intrinsic shape. Below $T_{trans}$, flexibility of the segments is at least partly limited.

In other cases, the polymer is chemically crosslinked. These chemical crosslinks are often covalent bonds. These chemical crosslinks can be formed as the polymer is initially cured, often by including a multifunctional monomer in the polymerization mixture. Alternatively, the chemical crosslinks can be formed after the initial polymerization, for example by radiation such as UV light or E-beam. The intrinsic shape of chemically crosslinked shape memory polymers is fixed as the crosslinks are formed, and this intrinsic shape of these chemically crosslinked polymers can usually not be changed even at extreme temperatures.

Useful SMPs may be physically and/or chemically crosslinked. Suitable physically crosslinked SMPs include linear block copolymers such as thermoplastic polyurethane elastomers with hard segments and soft switching segments. Multi-block copolymers can also serve as SMPs such as, for example, polyurethanes with polystyrene and poly(1,4-butadiene) blocks; ABA tri-block copolymers of poly(tetrahydrofuran) and poly(2-methyl-2-oxazoline); polyhedral oligomeric silsesquioxane (POSS)-modified polynorbornene; and polyethylene/Nylon-6 graft copolymers.

Examples of suitable chemically crosslinked shape-memory polymers include, but are not limited to, crosslinked high density polyethylene, crosslinked low density polyethylene, and crosslinked copolymers of ethylene and vinyl acetate.

Other examples of shape-memory polymers include: polyurethanes, polynorbornenes, polyethers, polyacrylates, polyamides, polysiloxanes, polyether amides, polyether esters, transpolyisoprenes, polymethyl methacrylates, cross-linked trans-polyoctylenes, cross-linked polyethylenes, cross-linked polycyclooctenes, inorganic-organic hybrid polymers, copolymer blends with polyethylene and styrene-butadiene co-polymers, urethane-butadiene co-polymers, polymethyl methacrylate, polycaprolactone, and oligocaprolactone copolymers. Suitable shape-memory polymers also include those described in U.S. Pat. No. 5,506,300 (Ward et al.); U.S. Pat. No. 5,145,935 (Hayashi); U.S. Pat. No. 5,665,822 (Bitler et al.); U.S. Pat. No. 6,160,084 (Langer); U.S. Pat. No. 6,388,043 (Langer); U.S. Pat. No. 5,155,199 (Hayashi); U.S. Pat. No. 7,173,096 (Mather et al.); U.S. Pat. No. 4,436,858 (Klosiewicz); U.S. Pat. No. 6,423,421 (Banaszak); and U.S. Pat. Appl. Publ. Nos. 2005/244353 (Lendlein et al.), U.S. 2007/009465 (Lendlein et al.), and 2006/041089 (Mather et al.).

Shape-memory polymer sheets (or rolls) can be processed by heating the shape-memory polymer sheet to near or above the shape-memory transition temperature range or the particular material utilized, then orienting the sheet by stretching or tentoring it in at least one direction (typically down-web when a roll-to-roll process is used) followed by cooling the sheet to lock in the strain caused by the stretching. In some embodiments, the shape-memory polymer sheet can be oriented in two or more directions. For example, biaxially-oriented films can be made by simultaneous downweb and crossweb stretching of the polymer film near or above its transition temperature range followed by cooling. Biaxially-oriented films or sheets can have a maximum shrink tension in one direction. The provided heat-debondable adhesive article has a temperature at or above which the shrink tension of the shape-memory polymer is sufficiently high to cause a substantial change in one or more dimensions of the shaped-memory polymer sheet. The process of making and orienting shape-memory polymeric sheets is well known to those having ordinary skill in the art.

Examples of commercially available thermoplastic SMPs include: polyurethanes available under the trade designation DIARY, including the MM, MP, MS, and MB (microbead powder) types series available from SMP Technologies, Inc. of Tokyo, Japan; elastic memory composites available under the trade designation EMC from Composite Technology Development, Inc. of Lafayette, Colo.; and polymers available under the trade designation VERIFLEX from Cornerstone Research Group, Inc. of Dayton, Ohio. The shape memory properties of acrylonitrile-butadiene-styrene (ABS) copolymers, polycarbonate, and polyethylene terephthalate are also disclosed by Hussein et al., in "New Technologies for Active Disassembly: Using the Shape Memory Effect in Engineering Polymers," *Int. J. Product Development*, 6, 431-449 (2008). Additional examples of commercially available shape-memory polymer films that can be converted into various shapes such as, for example, sheets include those heat shrink films available under the trade designations CORTUFF, CRYOVAC, and OPTI from Sealed Air Inc. of Elmwood Park, N.J. Additional examples include shrink films available under the trade designations SHRINKBOX, VHG, EZ, AFG, ABL and PLAnet from Bemis Clysar of Oshkosh, Wis.

The shape-memory polymer sheet may be suitable as prepared, or it may have at least one of a plurality of slits each having a width therein. The slits can be introduced into the shape-memory polymer sheet by cutting with a knife, die, laser, or any other article that is well known to cut polymeric sheets. The slits can be in any shape and can start and end within the perimeter of the sheet or can extend through the perimeter of the sheet at one or more ends. The total length of the first plurality of slits is sufficient to provide at least 0.35 cm of slit length for every square cm of area of the shape-memory polymer sheet in its strained temporary shape. The term "slit length" describes the longest dimension of an opening or slit in the shape memory polymer sheet. The "total slit length" is the sum of the plurality of slit lengths in the shape-memory polymer sheet. Typically, when slits are present, the ratio of the total length of the plurality of slits (or total slit length) to the area of the shape-memory polymer sheet is greater than 0.35 cm/cm$^2$. This ratio can be greater than about 0.40 cm/cm$^2$, greater than about 1.0 cm/cm$^2$, or even greater.

In some embodiments, the heat-shrinkable substrate comprises a multi-layer substrate. At least a portion of this multi-layer substrate has a threshold shrink force of at least 100 grams per inch (3.85 N/dm). All of the layers of the multi-layer substrate may be heat-shrinkable, or some layers may not be heat-shrinkable. The multiple layers may be adhesively bonded together or they may be laminated together through the use of pressure and/or heat. Some multi-layer substrates are prepared in a single step by multi-layer extrusion, other multi-layer substrates are prepared by lamination or bonding of separate layers of material. If not all of the layers of a multi-layer substrate are heat-shrinkable, the multi-layer substrate may comprise a central core layer that is heat-shrinkable and one or more sheath layers that are not heat-shrinkable. The heat shrink films described above can be used as the central heat-shrinkable layer of the multi-layer substrate. The sheathing layers can be formed from any suitable optically clear polymeric film layer. Examples of suitable polymeric films suitable for use as sheathing layers include polyester films, polyolefin films, poly(meth)acrylate films, cellulose films, and polyurethane films.

A wide variety of optically clear adhesives can be used as the first adhesive in the adhesive articles of this disclosure. Among the suitable classes of adhesives are heat activated adhesives, pressure sensitive adhesives, gel adhesives, curable adhesives, and hot melt adhesives. The choice of adhesive for the adhesive article depends upon a wide range of factors such as the desired use for the adhesive article (such as the identity and composition of the substrates to which the adhesive is to be bonded, the environmental conditions the adhesive article to which the adhesive article is to be exposed, etc), and the other components in the adhesive article (especially the heat-shrinkable substrate). The adhesive is proximate to the heat-shrinkable substrate and typically is in contact with the heat-shrinkable substrate. Since the heat-shrinkable substrate and the adhesive together form the adhesive articles of this disclosure, it is generally desirable that they have the same or similar thicknesses.

Each adhesive layer in the optical article has a Failure Force of from about 0.1 to about 85 grams per inch (0.0039-3.3 N/dm). In some embodiments, the Failure Force is from 0.1 to about 70 grams per inch (0.0039-2.7 N/dm) or even 0.1 to about 31 grams per inch (0.0039-1.2 N/dm). This Failure Force is dependent upon the composition and properties of the adhesive and also upon the way the adhesive interacts with the heat-shrinkable substrate (for example if the heat-shrinkable substrate is a multi-layer article or has an adhesion reducing coating). The Failure Force is not measured directly for the adhesive article, but is modeled by the use of 90° Peel Adhesion using an adapted version of the Test Method ASTM D3330-90 (as described in the Examples section) at room temperature or the use of 180° Peel Adhesion at 100° C. using a modified version of the Test Method ASTM D3330-90 (as described in the Examples section) to a glass substrate of a test sample comprising the adhesive layer disposed on the heat-shrinkable substrate. In other words a test "tape" is prepared with the adhesive layer using the heat-shrinkable substrate as the backing. A conventional 90° Peel Adhesion Test (at room temperature) or a conventional 180° Peel Adhesion Test (at 100° C.) is then run using a glass substrate to measure the Failure Force value. The test typically is run at room temperature, but it may also be run at an elevated temperature, generally 100° C. The test may be run at an elevated temperature to more closely mimic the failure of the adhesive article in practice, since the failure of the adhesive article is at an elevated temperature. The use of an elevated temperature allows adhesives to be characterized that may not have the desired Failure Force value at room temperature, but do have the appropriate Failure Force under conditions more closely approximating the use conditions for the actual article (such as at an elevated temperature). An example of such an adhesive may be a hot melt type of adhesive. These adhesives can be cohesively quite strong at room temperature, but upon heating the cohesive strength drops dramatically, permitting cohesive failure of the adhesive (described in more detail below) during the elevated temperature peel adhesion test.

Just as the threshold shrink force is a characteristic and measurable physical property of the heat-shrinkable film, the Failure Force is a characteristic and measurable physical property of the adhesive. It should be noted that the Failure Force is a value associated only with the adhesive and is measured by the Peel Adhesion tests described above and does not refer to failure of the articles formed from the heat-shrinkable substrate and adhesive. While it has been found that constructions that contain heat-shrinkable substrates that have the desired threshold shrink force and adhesives with the desired Failure Force will de-bond upon heating as desired, the Failure Force test is simply a model test used to characterize the adhesive.

The Failure Force is used as a model test because testing of the actual constructions of this disclosure is either very difficult or impossible. Because many of the articles contain substrates that are rigid or semi-rigid, conventional peel adhesion tests cannot be run on these articles directly. Therefore, the Failure Force (in conjunction with the threshold shrink force) is used to determine which adhesives (and which combinations of adhesive and heat-shrinkable substrates) are suitable for use in the constructions of this disclosure.

Determination of Failure Force Peel Adhesion values is a useful screening method, since they correlate to actual observed failures in constructions, as will be shown in the Examples section. It must be noted however that the Failure Force values are only one factor for determining whether the adhesive article will de-bond upon heating. Other factors to take into account include the threshold shrink force of the heat-shrinkable substrate, the failure mode (discussed in greater detail below), as well as other factors such as the size of the adhesive article.

Failure Force value is used to characterize the first adhesive because it is the failure of the combined adhesive/heat-shrinkable substrate that is desired for the adhesive articles and thus for the constructions of this disclosure, and a variety of different failure modes are possible. Primarily two failure modes exist for the optical substrate/first adhesive bonds that are modeled by the testing protocols of this disclosure. These are cohesive failure of the adhesive, and adhesive failure of the optical substrate/first adhesive bond. These failure modes are modeled by the failure mode scenarios described below.

A first failure mode scenario for the Failure Force is cohesive failure of the adhesive layer. In this failure mode, when the standard 90° Peel Adhesion Test is run using a glass substrate, the adhesive cohesively splits and some adhesive is left on the glass substrate and some adhesive is left on the heat-shrinkable substrate. This models the scenario where the first adhesive in the constructions cohesively fails during heating and some adhesive is left on each optical substrate.

A second failure mode scenario for the Failure Force is adhesive failure of the adhesive bonds. This means that the Failure Force of the first adhesive layer comprises adhesive failure of the first adhesive layer to the glass substrate. This failure mode is the failure mode typically observed in peel tests for pressure sensitive adhesives. In this failure mode, no adhesive (or essentially no adhesive) is left on the glass substrate, the adhesive is present on the heat-shrinkable substrate. This models the scenario where the first adhesive in the constructions adhesively fails during heating and all or essentially all of the adhesive is left on one optical substrate, or in some embodiments the adhesive fails from both optical substrates and is left as a separate layer not bonded to either optical substrate.

The Failure Force also applies to the second and third adhesives, if present. These adhesives are located on the major surfaces of the heat-shrinkable substrate, and therefore a lack of failure of these adhesives would inhibit the shrink force of the heat-shrinkable substrate. Just as with the first adhesive, a variety of failure modes are possible for these adhesives. At least four different failure mode scenarios are possible to generate the desired Failure Force values for adhesive/heat-shrinkable substrate articles of this disclosure. The Failure Force applies to both the first and second adhesive layer. If the adhesive layers are the same only one test need be run, but if the adhesive layers are different, the Failure Force for both adhesive layers are determined Because of the variable failure modes, a wide range of adhesive/heat-shrinkable substrate combinations are possible.

A first failure mode scenario for the Failure Force is cohesive failure of the adhesive layer. In this failure mode, when the standard 90° Peel Adhesion Test is run using a glass substrate, the adhesive cohesively splits and some adhesive is left on the glass substrate and some adhesive is left on the heat-shrinkable substrate.

A second failure mode scenario for the Failure Force is adhesive failure of the adhesive bonds. This means that the Failure Force of the first adhesive layer comprises adhesive failure of the first adhesive layer to the glass substrate, and the Failure Force of the second adhesive layer comprises adhesive failure of the second adhesive layer to the glass substrate. This failure mode is the failure mode typically observed in peel tests for pressure sensitive adhesives. In this failure mode, no adhesive (or essentially no adhesive) is left on the glass substrate, the adhesive is present on the heat-shrinkable substrate.

A third failure mode scenario for the Failure Force involves the use of multi-layer heat-shrinkable substrate (as described above). In this failure mode scenario, the Failure Force of the first adhesive layer comprises the peeling away of some layers of the multi-layer substrate and the retention of at least one layer of the multi-layer substrate to the first adhesive layer, and the Failure Force of the second adhesive layer comprises the peeling away of some layers of the multi-layer substrate and the retention of at least one layer of the multi-layer substrate to the second adhesive layer. In this failure mode, the failure occurs between layers of the heat-shrinkable substrate, and the adhesive remains adhered to the glass substrate together with at least one layer of the heat-shrinkable substrate.

A fourth failure mode scenario for the Failure Force is failure of the adhesive/heat-shrinkable substrate bond. In this failure mode scenario, the heat-shrinkable substrate is peeled away from the adhesive layer, leaving the adhesive layer on the glass substrate. This scenario is different from the third failure mode scenario described above in that in this failure mode scenario the heat-shrinkable substrate remains essentially intact.

As described above, each of these failure mode scenarios is for a model of the actual construction. The model is useful to describe the actual construction because the failure modes of the model mimic the failure modes of the actual adhesive article when heated to cause de-bonding. When the adhesive articles are heated, the shrink force of the heat-shrinkable substrate provides an input of force to cause the desired de-bonding. This de-bonding can result from one of the failure mode scenarios or may be a combination of these failure mode scenarios. Similarly, the failure mode of the first adhesive and the second and third adhesives can be the same or different.

Because the Failure Force can include a variety of failure modes, a wide selection of adhesives for the first, second and third adhesives are suitable depending upon the selection of heat-shrinkable substrate and the desired failure mode for de-bonding of the construction. A few illustrative examples are described below to illustrate the range of possibilities, but in no way are these illustrative examples an exhaustive list of possibilities, and these examples are presented for illustration only and should not be viewed as unduly limiting this disclosure. Additionally, these illustrations describe the first adhesive, but similar illustrations apply to the second and third adhesives.

For example, if the desired failure mode of the construction is cohesive failure of the adhesive layer, the desired adhesive is one that is cohesively weak. Examples of such adhesives include gel adhesives and some cohesively weak pressure sensitive and heat activated adhesives, and especially hot melt adhesives. Cohesive strength can be determined in a variety of methods (beside the 90° Peel Adhesion test described above), for example by determining the shear holding power of the adhesive. Also, as described above, hot melt adhesives, while they may have high cohesive strength at room temperature have low cohesive strength at elevated temperature. This low cohesive strength at elevated temperature is necessary for the adhesive to flow at elevated temperatures.

In some embodiments, the desired failure mode of the adhesive article is adhesive failure of the adhesive-substrate bond. Since, as will be described in greater detail below, many of the suitable substrates in the adhesive articles are glass substrates or other similar substrates, this failure mode is well modeled by the Peel Adhesion tests from glass substrates. Generally, suitable adhesives for this failure mode will have low adhesion to the substrates. This low adhesion may be a characteristic of the adhesive itself, or it can be produced through the use of coatings on the substrate to limit the adhesion of the adhesive layer to the substrate. Such coatings are more commonly used with film substrates (as described below) but can also be used with rigid and semi-rigid substrates. For example, the substrate could be coated with a low surface energy material to decrease the adhesion of the substrate-adhesive bond. Examples of such low surface energy materials include a variety of release coatings. The release coating could be applied to only portions of the substrate to permit sufficient adhesion of the adhesive during application and use of the adhesive article, but upon the application of heat and shrinkage of the heat-shrinkable substrate, the substrate-adhesive bond could fail. Additionally, the release coating could be a material such as is used on the back side of rolled tape products to permit the tape to be rolled up and remain intact and then to be unwound for use. Such materials are sometimes called Low Adhesion Backsizes or LABs. A wide variety of LABs have been developed for use with a wide variety of adhesives. Examples of suitable LAB or release coatings that are suitable include the water-based fluorochemical materials described in U.S. Pat. No. 7,411,020 (Carlson et al.); the polysiloxane release coatings described in U.S. Pat. No. 5,753,346 (Leir et al.); the release compositions describe in U.S. Pat. No. 7,229,687 (Kinning et al.); the polyvinyl N-alkyl carbamates described in U.S. Pat. No. 2,532,011 (Dalquist et al.); the moisture-curable materials described in U.S. Pat. No. 6,204,350 (Liu et al.); and the organopolysiloxanepoyurea copolymer release agents described in U.S. Pat. No. 5,290,615 (Tushaus et al.).

Another example of a coating that could be used is a heat sensitive primer coating. These primer coatings, when applied to the substrate, can provide a surface to which the adhesive layer adheres strongly. However, upon the application of heat, the primer layer changes to a surface to which the adhesive layer does not adhere strongly, permitting failure of the substrate-adhesive bond. This can occur by thermal degradation of the primer layer, for example.

As discussed above, a wide range of optically clear adhesives are suitable for use as the first adhesive of this disclosure. Examples of suitable optically clear adhesives include heat activated adhesives, pressure sensitive adhesives, gel adhesives, curable adhesives, and hot melt adhesives. Examples of each are described below.

Examples of suitable optically clear heat activated adhesives include polyvinyl butyrals, ionomers, polyolefins, or combinations thereof.

In some embodiments, the adhesive layer is at least partially formed of polyvinyl butyral. The polyvinyl butyral layer may be formed via known aqueous or solvent-based acetalization process in which polyvinyl alcohol is reacted with butyraldehyde in the presence of an acidic catalyst. In some instances, the polyvinyl butyral layer may include or be formed from polyvinyl butyral that is commercially available from Solutia Incorporated, of St. Louis, Mo., under the trade name "BUTVAR" resin.

In some instances, the polyvinyl butyral layer may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyl adipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

Examples of suitable ionomeric adhesives are the "ionoplast resins". Ionoplast resins are copolymers of ethylene and unsaturated carboxylic acids, wherein at least a portion of the acid groups in the copolymer have been neutralized to the salt form of the acid. Extruded sheets of ionoplast resins suitable for use in this disclosure are commercially available from DuPont Chemicals, Wilmington, Del., under the trade name "SENTRYGLASS PLUS".

Examples of suitable polyolefin adhesives include ethylene/α-olefin copolymers. As used herein, the term "ethylene/α-olefin copolymer" refers to polymers comprising a class of hydrocarbons manufactured by the catalytic oligomerization (i.e., polymerization to low-molecular-weight products) of ethylene and linear α-olefin monomers. The ethylene/α-olefin copolymers may be made, for example, with a single site catalyst such as a metallocene catalyst or multi-site catalysts such as Ziegler-Natta and Phillips catalysts. The linear α-olefin monomers typically are 1-butene or 1-octene but may range from C3 to C20 linear, branched or cyclic α-olefin. The α-olefin may be branched but only if the branch is at least alpha to the double bond, such as 3-methyl-1-pentene. Examples of C3-C20 α-olefins include propylene, 1-butene, 4-methyl-1-butene, 1-hexene, 1-octene, 1-dodecene, 1-tetradecene, 1-hexadecene and 1-octadecene. The α-olefins can also contain a cyclic structure such as cyclohexane or cyclopentane, resulting in an α-olefin such as 3-cyclohexyl-1 propene (allyl cyclohexane) and vinyl cyclohexane. Although not α-olefins in the classical sense of the term, for purposes of this disclosure certain cyclic olefins, such as norbornene and related olefins, are α-olefins and can be used. Similarly, styrene and its related olefins (for example, α-methyl styrene) are α-olefins for the purposes of this disclosure. Acrylic and methacrylic acid and their respective ionomers, and acrylates and methacrylates, however are not α-olefins for the purposes of this disclosure. Illustrative ethylene/α-olefin copolymers include ethylene/1-butene, ethylene/1-octene, ethylene/1-butene/1-octene, ethylene/styrene. The polymers can be block or random. Exemplary commercially available low crystalline ethylene/α-olefin copolymers include resins sold under the tradenames "ENGAGE" ethylene/1-butene and ethylene/1-octene copolymers and "FLEXOMER" ethylene/1-hexene copolymer, available from Dow Chemical Co., and homogeneously branched, substantially linear ethylene/α-olefin copolymers such as "TAFMER", available from Mitsui Petrochemicals Company Limited, and "EXACT", available from ExxonMobil Corp. As used herein, the term "copolymer" refers to polymers made from at least 2 monomers.

In some of these embodiments, the α-olefin moiety of the ethylene/α-olefin copolymer includes four or more carbons. In some embodiments, the ethylene/α-olefin copolymer is a low crystalline ethylene/α-olefin copolymer. As used herein, the term "low crystalline" means crystallinity (according to a method disclosed in ASTM F2625-07) of less than 50% by weight. In some embodiments, the low crystalline ethylene/α-olefin copolymer is a butene α-olefin. In some embodiments the α-olefin of the low crystalline ethylene/α-olefin copolymer has 4 or more carbons.

In some embodiments, the low crystalline ethylene/α-olefin copolymer has a DSC peak melting point of less than or equal to 50° C. As used herein, the term "DSC peak melting point" means a melting point determined by DSC (10°/min) under nitrogen purge as the peak with the largest area under the DSC curve.

Examples of suitable optically clear pressure sensitive adhesives include those based on natural rubbers, synthetic rubbers, styrene block copolymers, polyvinyl ethers, acrylics, poly-α-olefins, silicones, urethanes or ureas.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60, a controlled viscosity rubber grade and SMR-5, a ribbed smoked sheet rubber grade.

Tackifying resins used with natural rubbers generally include but are not limited to wood rosin and its hydrogenated derivatives; terpene resins of various softening points, and petroleum-based resins, such as, the "ESCOREZ 1300" series of C5 aliphatic olefin-derived resins from Exxon, and "PICCOLYTE S" series, polyterpenes from Hercules, Inc. Antioxidants are used to retard the oxidative attack on natural rubber, which can result in loss of the cohesive strength of the natural rubber adhesive. Useful antioxidants include but are not limited to amines, such as N—N' di-β-naphthyl-1,4-phenylenediamine, available as "AGERITE D"; phenolics, such as 2,5-di-(t-amyl) hydroquinone, available as "SANTOVAR A", available from Monsanto Chemical Co., tetrakis[methylene 3-(3',5'-di-tert-butyl-4'-hydroxyphenyl)propianate]methane, available as "IRGANOX 1010" from Ciba-Geigy Corp., and 2-2'-methylenebis(4-methyl-6-tert butyl phenol), available as Antioxidant 2246; and dithiocarbamates, such as zinc dithiodibutyl carbamate. Other materials can be added to natural rubber adhesives for special purposes, wherein the additions can include plasticizers, pigments, and curing agents to partially vulcanize the pressure sensitive adhesive.

Another useful class of pressure sensitive adhesives are those comprising synthetic rubber. Such adhesives are generally rubbery elastomers, which are either self-tacky or non tacky and require tackifiers.

Self-tacky synthetic rubber pressure sensitive adhesives include for example, butyl rubber, a copolymer of isobutylene with less than 3 percent isoprene, polyisobutylene, a homopolymer of isoprene, polybutadiene, such as "TAKTENE 220 BAYER" or styrene/butadiene rubber. Butyl rubber pressure sensitive adhesives often contain an antioxidant such as zinc dibutyl dithiocarbamate. Polyisobutylene pressure sensitive adhesives do not usually contain antioxidants. Synthetic rubber pressure sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as "IRGANOX 1010". An example of a synthetic rubber is "AMERIPOL 1011A", a styrene/butadiene rubber available from BF Goodrich. Tackifiers that are useful include derivatives of rosins such as "FORAL 85", a stabilized rosin ester from Hercules, Inc., the "SNOWTACK" series of gum rosins from Tenneco, and the "AQUATAC" series of tall oil rosins from Sylvachem; and synthetic hydrocarbon resins such as the "PICCOLYTE A" series, polyterpenes from Hercules, Inc., the "ESCOREZ 1300" series of C5 aliphatic olefin-derived resins, the "ESCOREZ 2000" Series of C9 aromatic/aliphatic olefin-derived resins, and polyaromatic C9 resins, such as the "PICCO 5000" series of aromatic hydrocarbon resins, from Hercules, Inc. Other materials can be added for special purposes, including hydrogenated butyl rubber, pigments, plasticizers, liquid rubbers, such as "VISTANEX LMMH" polyisobutylene liquid rubber available from Exxon, and curing agents to vulcanize the adhesive partially.

Styrene block copolymer pressure sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as "KRATON D1107P", available from Shell Chemical Co., and "EUROPRENE SOL TE 9110", available from EniChem Elastomers Americas, Inc.; linear styrene-(ethylene-butylene) block copolymers such as "KRATON G1657", available from Shell Chemical Co.; linear styrene-(ethylene-propylene) block copolymers such as "KRATON G1750X", available from Shell Chemical Co.; and linear, radial, and star styrene-butadiene block copolymers such as "KRATON D1118X", available from Shell Chemical Co., and "EUROPRENE SOL TE 6205", available from EniChem Elastomers Americas, Inc. The polystyrene blocks tend to form domains in the shape of spheroids, cylinders, or plates that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as the "ESCOREZ 1300" series and the "WINGTACK" series, available from Goodyear; rosin esters, such as the "FORAL" series and the "STAYBELITE" Ester 10, both available from Hercules, Inc.; hydrogenated hydrocarbons, such as the "ESCOREZ 5000" series, available from Exxon; polyterpenes, such as the "PICCOLYTE A" series; and terpene phenolic resins derived from petroleum or terpentine sources, such as "PICCOFYN A100", available from Hercules, Inc. Resins that associate with the thermoplastic phase tend to stiffen the pressure sensitive adhesive. Thermoplastic phase associating resins include polyaromatics, such as the "PICCO 6000" series of aromatic hydrocarbon resins, available from Hercules, Inc.; coumarone-indene resins, such as the "CUMAR" series, available from Neville; and other high-solubility parameter resins derived from coal tar or petroleum and having softening points above about 85° C., such as the "AMOCO 18" series of alphamethyl styrene resins, available from Amoco, "PICCOVAR 130" alkyl aromatic polyindene resin, available from Hercules, Inc., and the "PICCOTEX" series of alphamethyl styrene/vinyl toluene resins, available from Hercules. Other materials can be added for special purposes, including rubber phase plasticizing hydrocarbon oils, such as, "TUFFLO 6056", available from Lydondell Petrochemical Co., Polybutene-8 from Chevron, "KAYDOL", available from Witco, and "SHELL-FLEX 371", available from Shell Chemical Co.; pigments; antioxidants, such as "IRGANOX 1010" and "IRGANOX 1076", both available from Ciba-Geigy Corp., "BUTAZATE", available from Uniroyal Chemical Co., "CYANOX LDTP", available from American Cyanamid, and "BUTASAN", available from Monsanto Co.; antiozonants, such as "NBC", a nickel dibutyldithiocarbamate, available from DuPont; liquid rubbers such as "VISTANEX LMMH" polyisobutylene rubber; and ultraviolet light inhibitors, such as "IRGANOX 1010" and "TINUVIN P", available from Ciba-Geigy Corp.

Polyvinyl ether pressure sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure sensitive properties. Depending on the degree of polymerization, homopolymers may be viscous oils, tacky soft resins or rubber-like substances. Polyvinyl ethers used as raw materials in polyvinyl ether adhesives include polymers based on: vinyl methyl ether such as "LUTANOL M 40", available from BASF, and "GANTREZ M 574" and "GANTREZ 555", available from ISP Technologies, Inc.; vinyl ethyl ether such as "LUTANOL A 25", "LUTANOL A 50" and "LUTANOL A 100"; vinyl isobutyl ether such as "LUTANOL 130", "LUTANOL 160", "LUTANOL IC", "LUTANOL I60D" and "LUTANOL I 65D"; methacrylate/vinyl isobutyl ether/acrylic acid such as "ACRONAL 550 D", available from BASF. Antioxidants useful to stabilize the polyvinylether pressure sensitive adhesive include, for example, "IONOX 30" available from Shell, "IRGANOX 1010" available from Ciba-Geigy, and antioxidant "ZKF" available from Bayer Leverkusen. Other materials can be added for special purposes as described in BASF literature including tackifier, plasticizer and pigments.

Acrylic pressure sensitive adhesives generally have a glass transition temperature of about −20° C. or less and may comprise from 100 to 80 weight percent of a $C_3$-$C_{12}$ alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macromer. Generally, the acrylic pressure sensitive adhesives comprise from 0 to 20 weight percent of acrylic acid and from 100 to 80 weight percent of isooctyl acrylate. The acrylic pressure sensitive adhesives may be self-tacky or tackified. Useful tackifiers for acrylics are rosin esters such as "FORAL 85", available from Hercules, Inc., aromatic resins such as "PICCOTEX LC-55WK", aliphatic resins such as "PICCOTAC 95", available from Hercules, Inc., and terpene resins such as α-pinene and β-pinene, available as "PICCOLYTE A-115" and "ZONAREZ B-100" from Arizona Chemical Co. Other materials can be added for special purposes, including hydrogenated butyl rubber, pigments, and curing agents to vulcanize the adhesive partially.

Poly-α-olefin pressure sensitive adhesives, also called a poly(l-alkene) pressure sensitive adhesives, generally comprise either a substantially uncrosslinked polymer or a uncrosslinked polymer that may have radiation activatable functional groups grafted thereon as described in U.S. Pat. No. 5,209,971 (Babu, et al) which is incorporated herein by reference. The poly-α-olefin polymer may be self tacky and/or include one or more tackifying materials. If uncrosslinked, the inherent viscosity of the polymer is generally between about 0.7 and 5.0 dL/g as measured by ASTM D 2857-93, "Standard Practice for Dilute Solution Viscosity of Polymers". In addition, the polymer generally is predominantly amorphous. Useful poly-α-olefin polymers include, for example, $C_3$-$C_{18}$ poly(1-alkene) polymers, generally $C_5$-$C_{12}$ α-olefins and copolymers of those with $C_3$ or $C_6$-$C_8$ and copolymers of those with $C_3$. Tackifying materials are typically resins that are miscible in the poly-α-olefin polymer. The total amount of tackifying resin in the poly-α-olefin polymer ranges between 0 to 150 parts by weight per 100 parts of the poly-α-olefin polymer depending on the specific application. Useful tackifying resins include resins derived by polymerization of $C_5$ to $C_9$ unsaturated hydrocarbon monomers, polyterpenes, synthetic polyterpenes and the like. Examples of such commercially available resins based on a $C_5$ olefin fraction of this type are "WINGTACK 95" and "WINGTACK 15" tackifying resins available from Goodyear Tire and Rubber Co. Other hydrocarbon resins include "REGALREZ 1078" and "REGALREZ 1126" available from Hercules Chemical Co., and "ARKON P115" available from Arakawa Chemical Co. Other materials can be added for special purposes, including antioxidants, fillers, pigments, and radiation activated crosslinking agents.

Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups (OSiMe$_3$) and also contains some residual silanol functionality. Examples of tackifying resins include SR 545, from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir, et al). Other materials can be added for special purposes, including, pigments, plasticizers, and fillers. Fillers are typically used in amounts from 0 parts to 10 parts per 100 parts of silicone pressure sensitive adhesive. Examples of fillers that can be used include zinc oxide, silica, carbon black, pigments, metal powders and calcium carbonate.

Useful polyurethane and polyurea pressure sensitive adhesives useful include, for example, those disclosed in WO 00/75210 (Kinning et al.) and in U.S. Pat. No. 3,718,712 (Tushaus); U.S. Pat. No. 3,437,622 (Dahl); and U.S. Pat. No. 5,591,820 (Kydonieus et al.). Additionally, the urea-based pressure sensitive adhesives described in US Patent Publication No. 2011/0123800 (Sherman et al.) and the urethane-based pressure sensitive adhesives described in US Patent Publication No. 2012/0100326 (Sherman et al.) may be particularly suitable.

Examples of suitable optically clear gel adhesives include, for example cross-linked or cross-linkable silicone gel adhesives. The cross-linked or cross-linkable silicone gel adhesives can be formed of any useful silicone materials such as, for example, dimethylsilicone, diphenylsilicone, or phenylmethylsilicone. In many embodiments, the cross-linked or cross-linkable silicone gel has a refractive index in a range from 1.5 to 1.6 or from 1.5 to 1.58, or from 1.51 to 1.57. In one embodiment, the cross-linked or cross-linkable silicone gel has a refractive index in a range from 1.51 to 1.53. In one embodiment, the cross-linked silicone gel can include phenylmethylsilicone moieties that are cross-linked. In another embodiment, the cross-linked silicone gel can include phenylmethylsilicone moieties which are cross-linked and phenylmethylsilicone oil. In some embodiments, the cross-linked silicone gel includes cross-linked phenylmethylsilicone moieties and phenylmethylsilicone oil in a weight ratio from 1:5 to 5:1, or 1:4 to 4:1, or 1:3 to 3:1. In one embodiment, the cross-linked silicone gel includes cross-linked phenylmethylsilicone moieties and phenylmethylsilicone oil in a weight ratio from 1:3 to 1:1. In one illustrative embodiment, the uncured silicone includes phenylmethylsilicone having a refractive index of 1.52 at 589 nm, a viscosity of 400 cP and is commercially available under the tradename LS-3252 Encapsulation Gel from Lightspan, LLC (Wareham, Mass.) Upon curing, this cross-linked silicone forms a gel having a Durometer of 10, a specific gravity of 1.07, with a refractive index of 1.52 at 589 nm. Other gels formed from cross-linked or cross-linkable silicone materials may have lower refractive indices.

Examples of suitable curable adhesives include adhesives that are applied as a liquid and then cured to form an optically clear adhesive layer. These types of adhesives are becoming more prevalent in the display industry to fill the air gap between coverglass and ITO touch sensors, and ITO touch sensors and liquid crystal module, or directly between the coverglass and the liquid crystal module.

Examples of suitable curable liquid adhesives and the methods for using them in optical devices are described in US Patent Publication No. 2009/0215351 (Kobayashi et al.) and PCT Publication Nos. WO 2012/036980 and WO 2011/119828. The photo-curable resins for manufacturing display devices described in U.S. Pat. No. 7,927,533 (Kamiya et al.) are also suitable, as well as the stress-relieving optical adhesives described in PCT Publication No. WO 2012/024217.

A variety of hot melt adhesives are suitable. Examples of suitable hot melt adhesives include optically clear (meth)acrylate-based hot melt adhesives and ethylene vinyl acetate hot malt adhesives.

The optically clear (meth)acrylate-based hot melt adhesives typically are prepared from (meth)acrylate polymers that have a glass transition temperature (Tg) of greater than room temperature, more typically greater than about 40° C., and are prepared from alkyl(meth)acrylate monomers. Useful alkyl(meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic hot melt adhesives may also contain optional co-monomer components such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

Examples of suitable ethylene vinyl acetate (EVA) adhesives include a wide range of commercially available EVA hot melt adhesives. Typically these EVA hot melt adhesives have a vinyl acetate content of from about 18-29% by weight of the polymer. The adhesives typically have high amounts of tackifiers and waxes. An exemplary composition is one with 30-40% by weight of EVA polymer, 30-40% by weight of tackifier, 20-30% by weight of wax, and 0.5-1% by weight of stabilizers. Examples of suitable EVA hot melt adhesives are the BYNEL SERIES 3800 resins commercially available from DuPont, Wilmington, Del. (including BYNEL 3810, BYNEL 3859, BYNEL 3860, and BYNEL 3861). A particularly suitable EVA hot melt adhesive is the material available from Bridgestone Corp. Tokyo, JP under the trade name "EVASAFE".

As described above, the adhesive article may optionally also comprise a second and a third adhesive. The second and third adhesive may be the same or different. Also, one or both of the second and third adhesive may be the same as the first adhesive. The second and third adhesive are disposed on the major surfaces of heat-shrinkable substrate. The layers of second and third adhesive are present to adhere the heat-shrinkable substrate to the two optical substrates. Just as the heat-shrinkable substrate need not be optically clear if it is not in the optical path of light passing through the optical substrates, so also the second adhesive need not be optically clear. As with the heat-shrinkable substrate, it may be desirable that the second and third adhesive be optically clear, for aesthetic or other reasons. Any of the adhesives described above are suitable for the second and third adhesive. Additionally, other similar adhesives that are not optically clear may also be suitable, as long as they have the Failure Force described above. Since this adhesive is merely used to attach the heat-shrinkable substrate to the optical substrates, it may be very thin and may not have particularly strong adhesion.

FIG. 1 shows an example of an article comprising a heat-shrinkable substrate 100 with a second adhesive layer 110 and third adhesive layer 120 disposed on it. The adhesive layers 110 and 120 provide adhesion to optical substrates in constructions described in greater detail below. In some embodiments, it may be desirable to have a release liner in contact with one or both of the adhesive layers 110 and 120 (not shown) to protect the adhesive layer until use. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The liner can have a microstructure on its surface that is imparted to the adhesive to form a microstructure on the surface of the adhesive layer. The liner can then be removed to expose an adhesive layer having a microstructured surface.

The constructions of this disclosure include the multi-component adhesive articles described above, and two optical substrates. A wide variety of optical substrates are suitable for forming the constructions of this disclosure. The optical substrates may be the same or different. The optical substrates may be rigid or semi-rigid or they may be flexible. The adhesive articles of this disclosure are particularly suitable for use in optical articles where at least one of the substrates is rigid or semi-rigid, because these articles can be very difficult to de-bond. Articles where both substrates are flexible often can be de-bonded through the use of a peel mechanism. However, even optical articles where both substrates are flexible are suitable for use with the adhesive articles of this disclosure because often de-bonding by peel force, especially for large surface area substrates, can be difficult, time consuming and labor intensive. Therefore, heat de-bondability can also be desirable for optical articles with flexible substrates and such articles are within the scope of this disclosure.

Examples of optically clear rigid and semi-rigid substrates include plates, sheets, the surfaces of articles, and the like. The rigid or semi-rigid substrate may be optically clear, optically transparent or non-transparent. Examples of non-transparent substrates include ones that are reflective scattering elements.

Examples of plates include a wide array of optically clear materials. Examples of suitable plates include a variety of glasses or from polymeric materials such as polycarbonate or polymethyl methacrylate. The plates may be in a variety of thickness and may be flat or curved. In some embodiments, the plate may also comprise additional layers or treatments. Examples of additional layers include, for example, additional layers of film designed to provide tinting, shatter resistance and the like. Examples of additional treatments that may be present include, for example, coatings or various types such as hardcoats.

Sheets are similar to plates but generally are thinner and less rigid than plates. Examples of sheets include, for example, optically clear semi-rigid substrates of glass or other optically clear materials that are 25-100 micrometers in thickness.

Examples of substrates that are the surface of an article include, but are not limited to, the outer surface of an electronic display such as liquid crystal display or a cathode ray tube, an electronic device such as a touch screen, the outer surface of a window or glazing, the outer surface of an optical component such as a reflector, polarizer, diffraction grating, mirror, or lens, or the like. The substrate can contain polymeric materials, glass materials, ceramic materials, metal-containing materials (e.g., metals or metal oxides), or a combination thereof. Representative examples of polymeric materials include polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like. The substrate may be a reflective scattering element. Reflective scattering elements are ones that exhibit diffuse or semi-specular reflection. Diffuse and semi-specular reflections involve the reflection of light from a surface such that an incident ray is reflected at many angles rather than at just one angle as in specular reflection. A wide array of materials can be used to prepare reflective scattering elements, such as plaster, paper, fibrous materials such as cloth and non-woven fiber mats, inorganic filled reflective polymers, ceramic materials, crystalline surfaces, and voided polymeric materials. Examples of reflective scattering elements include graphics such as signs, markings or pictures; rough reflective surfaces of metals such as brushed aluminum and chrome; coated surfaces such as painted, printed, or ink-coated surfaces.

Examples of flexible optical substrates include a wide array of optical films. As used herein, the term "optical film" refers to a film that can be used to produce an optical effect. The optical films are typically polymer-containing films that can be a single layer or multiple layers. The optical films can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and antifingerprint films.

In some embodiments the optical film has a coating. In general, coatings are used to enhance the function of the film or provide additional functionality to the film. Examples of coatings include, for example, hardcoats, anti-fog coatings, anti-scratch coatings, privacy coatings, anti-fingerprint coatings, antimicrobial coatings or a combination thereof. Coatings such as hardcoats, anti-fog coatings, and anti-scratch coatings that provide enhanced durability, are desirable in applications such as, for example, touch screen sensors, display screens, graphics applications and the like. Examples of privacy coatings include, for example, blurry or hazy coatings to give obscured viewing or louvered films to limit the viewing angle. Examples of anti-fingerprint coatings include those described in pending U.S. Patent Application Ser. No. 61/486,000 filed May 13, 2011 titled: "COATING COMPOSITIONS COMPRISING NON-IONIC SURFACTANT EXHIBITING REDUCED FINGERPRINT VISIBILITY" which describes coatings prepared from a curable resin and a non-ionic surfactant. Examples of anti-microbial coatings include those described in U.S. Pat. No. 8,124,169 (Ylitalo et al.) which describe an antimicrobial coating system that includes a film-forming composition and an effective amount of an antimicrobial agent dispersed within the film-forming composition.

In certain embodiments, a coating can be added to the substrate to affect the optical properties of the substrate. An example of such a coating is a low refractive index coating. Examples of such coatings include those described in U.S. Pat. No. 7,374,812 (Mizuno) which describes silicone-modified fluoropolymers that are formed by first dissolving a fluoropolymer having at least one monomer of vinylidene fluoride coupled to a hexafluoropropylene monomer unit in an organic solvent and subsequently reacting the mixture with an amino silane coupling agent to form an aminosilane-modified fluoropolymer. The aminosilane fluoropolymer is subsequently heated and partially condensed with an oligomer of a silane compound including alkoxy silane. These silicone-modified fluoropolymers can be used to provide coatings that have a low refractive index. Coatings or substrates with low refractive index can be particularly useful with the self-wetting, optically clear pressure sensitive adhesive compositions described above, because, as described above, many embodiments of the adhesive compositions have high refractive indices. Therefore, a low refractive index layer can be proximate to a high refractive index layer to give desirable optical properties such as anti-reflection.

Another class of low refractive index coatings that can be applied to a film or a substrate is porous coatings. These types of coatings are described in a series of patents: U.S. Pat. No. 5,585,186 (Scholz et al.); U.S. Pat. No. 5,873,931 (Scholz et al.); and U.S. Pat. No. 5,753,373 (Scholz et al.), which teach coatings with anti-reflective and anti-fogging properties. Each of these applications utilizes a porous inorganic metal oxide (such as, for example, silicon dioxide) in conjunction with an organic molecule or molecules. In U.S. Pat. No. 5,585,186 a silane or a siloxane oligomer is included, in U.S. Pat. No. 5,873,931 anionic surfactants are included, and in U.S. Pat. No. 5,753,373 polyhydroxy surfactants are included. In these references, the term "porous" refers to the presence of voids between the inorganic metal oxide particles created when the particles pack together. For single layer coatings, it is known that in order to maximize light transmission in air through an optically transparent substrate, and minimize reflection by the substrate, the refractive index of the coating should equal as closely as possible the square root of the refractive index of the substrate and the thickness of the coating should be one-fourth (¼) of the optical wavelength of the incident light. The voids in the coating provide a multiplicity of subwavelength interstices between the metal oxide particles where the refractive index (RI) abruptly changes from that of air (RI=1) to that of the metal oxide particles (e.g., for silica RI=1.44). By adjusting the porosity, a coating having a calculated refractive index (as shown in U.S. Pat. No. 4,816,333 (Lange, et al.)) very close to the square root of the refractive index of the substrate can be created. By utilizing coatings having optimal refractive indices, at coating thicknesses equal to approximately one-fourth the optical wavelength of the incident light, the percent transmission of light through the coated substrate is maximized and reflection is minimized. The voids in the coating are present substantially throughout; however, the coating may vary in density, e.g., the coating may become gradually more porous moving away from the substrate producing a gradient density. Such a gradient density enhances the anti-reflective property of the coating. Generally, the network has a porosity of about 25 to 45 volume percent, more typically about 30 to 40 volume percent, when dried. Porosity may be calculated from the refractive index of the coating according to published procedures such as in W. L. Bragg, A. B. Pippard, Acta Crystallographica, volume 6, page 865 (1953). When the metal oxide is silicon dioxide, this porosity provides a coating having a refractive index of 1.2 to 1.4, or even 1.25 to 1.36, which is approximately equal to the square root of the refractive indices of polyester, polycarbonate, or polymethyl methacrylate substrates. For example, a porous silica coating having a refractive index of 1.25 to 1.36 is capable of providing a highly anti-reflective surface when coated on a polyethylene terephthalate substrate (RI=1.64) at a thickness of 1000-1200 Angstroms.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

Also disclosed herein are methods of preparing constructions using the multi-component adhesive articles, and methods of heat de-bonding the constructions.

The adhesive articles described above are multi-component articles comprising a heat-shrinkable substrate with two major surfaces and a first optically clear adhesive disposed proximate to the heat-shrinkable substrate. The adhesive article may also comprise a second and a third adhesive disposed on the two major surfaces of the heat-shrinkable substrate. The adhesive article is disposed between two optical substrates such that the first optically clear adhesive is disposed on a majority of the surface area of a major surface of at least one of the optical substrates. The heat-shrinkable substrate is located proximate to the edge of the first and the second optical substrates.

The constructions may contain one heat-shrinkable substrate, or multiple heat-shrinkable substrates. The multiple heat-shrinkable substrates may be, for example on opposite edges of the optical substrates, or they may be orthogonal to each other. Additionally, in some embodiments, the heat-shrinkable substrates may be proximate to the entire, or essentially the entire, perimeter of the optical substrates. This embodiment can be particularly useful with liquid optically clear adhesives. In this way, the heat-shrinkable substrate can form an edge "dam" to contain the liquid adhesive within the enclosed perimeter. Also, adhesives that might have a tendency to flow or ooze when placed between the optical substrates can also be contained by such an edge dam. Typically, in embodiments where the heat-shrinkable substrates are proximate to the entire perimeter of the optical substrates, the heat-shrinkable substrates are segmented and not continuous. While not wishing to be bound by theory, it is believed that this lack of continuity permits a more *facile* shrinkage upon the application of heat than would a continuous heat-shrinkable substrate.

As described above the heat-shrinkable substrate may be a single layer substrate or it may be a multi-layer substrate. Single layer substrates may be a commercially available material such as a shrink film or it may be prepared from a film material by the appropriate application of heat and stretching. Multi-layer optically clear heat-shrinkable substrates may have all layers heat shrinkable or some layers that are not heat shrinkable. One particularly useful example of a multi-layer substrate suitable for use in this disclosure is a three layer film comprising a heat shrink film core layer with 2 non-shrinkable film sheath layers. The sheath layers may be laminated to the shrink film by direct lamination using pressure and/or heat or they may be adhesively laminated using either a very thin layer of pressure sensitive adhesive or a weakly adhering adhesive such as a gel adhesive (as described above). It is typically desirable that the sheath layers be weakly adhered to the core layer such that upon the application of heat and the generation of the shrink force in the core layer, the sheath layer-core layer bond breaks to leave the sheath layers adhered to the optically clear adhesive layers disposed on them. In other embodiments, the multi-layer heat-shrinkable substrate is a multi-layer film in which all layers are heat-shrinkable. These multi-layer films can be prepared by conventional multi-layer extrusion or lamination techniques. In still other embodiments, the multi-layer heat-shrinkable substrate comprises a heat shrink film core layer with coatings on the exterior surfaces. In some embodiments, these coatings are such that they weakly adhere to the core layer such that upon the application of heat and the generation of the shrink force in the core layer, the coating-core layer bonds break and the coatings adhere to the adhesive layer disposed on them. Examples of such coatings include, for example, hot melt types of materials. In this way, the coatings are similar to the sheath layers described above.

In other embodiments, the coatings are release coatings. These coatings are not designed to be removed from the core layer upon application of heat and the generation of the shrink force. Rather these coatings adhere relatively strongly to the core layer, but they produce a relatively weak bond between the core layer and the optically clear adhesive layers disposed on the coating surface of the core layer. These release coatings may be continuous or discontinuous.

Examples of suitable release coating materials include LAB (Low Adhesion Backsize) materials used in tapes, as described above.

Coatings applied to a heat-shrinkable film can be applied either simultaneously or sequentially using conventional coating techniques. The coatings can be applied as solvent-borne, water-borne, or 100% solids coatings. The coatings can be applied by any suitable process such as by, for example, knife coating, roll coating, gravure coating, rod coating, curtain coating, and air knife coating. The coatings may also be applied by printing techniques such as screen printing or inkjet printing. Coatings applied as 100% solids coatings may be applied by hot melt coating using an extruder or similar device provided that such coating does not cause sufficient heat transfer to the film to cause premature film shrinkage or heat setting of the film. Typically the coatings are relatively thin, typically 3-30 micrometers.

The constructions of this disclosure may be prepared by providing a heat-shrinkable substrate with a first major surface and second major surface as described above and providing a first optical substrate with a first major surface and second major surface and at least one edge, and disposing the first major surface of the heat-shrinkable substrate proximate to the edge of the second major surface of the first optical substrate. A layer of a first optically clear adhesive as described above is applied to a majority of the surface area of the second major surface of the first optical substrate to create an adhesive bond between the first optical substrate and the layer of first optically clear adhesive. The heat-shrinkable substrate and proximate layer of first optically clear adhesive form a multi-component adhesive article disposed on the first optical substrate. A second optical substrate with a first major surface and a second major surface and at least one edge is disposed on the surface of the multi-component adhesive article such that the edge of the second optical substrate is proximate to the second major surface of the heat-shrinkable substrate to form a multi-layer construction comprising: first optical substrate/multi-component adhesive article/second optical substrate.

Figure 2A:
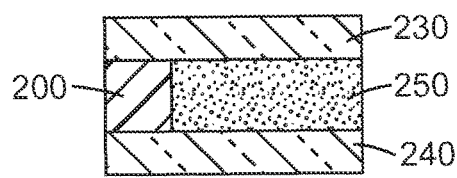
FIG. 2A shows a cross sectional view of a multi-layer optical article according to one embodiment of this disclosure.

An example of a multi-layer construction of this disclosure is shown in FIG. 2A. Heat-shrinkable substrate 200 is disposed proximate to adhesive layer 250 and proximate to the edge of optical substrate 230 and optical substrate 240.

In some embodiments, it may be desirable to dispose layers of adhesive (called second and third adhesives above) on the two major surfaces of the heat-shrinkable substrate. The second and third adhesive layers can be disposed on the heat-shrinkable substrate either simultaneously or sequentially. Additionally, the adhesive layers can be coated onto the surface of the optically clear heat-shrinkable substrate, or the adhesive layers may be coated onto a release liner or similar substrate and laminated to the heat-shrinkable substrate. In some embodiments, particularly embodiments where the adhesive layer is hot melt coated or applied as a solvent-borne or water-borne coating and then dried by the application of heat, it may advantageous to coat the adhesive onto a release liner and then laminate to the heat-shrinkable substrate to avoid exposing the heat-shrinkable substrate to heat during coating. In the cases where the adhesive comprises a heat activated adhesive, the application of mild heat may be necessary during lamination to provide a strong film-adhesive bond. The formed adhesive articles are of the type: second adhesive layer/heat-shrinkable substrate/third adhesive layer. These articles can be used to prepare constructions of the type described above, using the procedure described above. In some embodiments, the second adhesive layer and/or the third adhesive layer of the adhesive articles may have release liners disposed on the adhesive surface to protect the adhesive surface prior to disposing the adhesive surface on the optical substrate. In some embodiments, the release liner may have a microstructured surface. The use of microstructured release liners can be used to provide a microstructured surface to the adhesive layer. The microstructured pattern of the liner is pressed into the adhesive surface and upon removal of the liner a pattern that is the inverse of the microstructured pattern of the liner is left in the surface of the adhesive layer. This pattern is generally a series of microchannels. The microchannels can permit the adhesive layer to be contacted to a rigid or semi-rigid substrate without the entrapment of air because the entrapped air can escape the though the microchannels of the microstructured pattern. Typically the adhesive layer has enough ability to flow that upon the egress of air from the microchannels, the microchannels collapse and an air bubble free adhesive bond is formed.

Figure 3A:
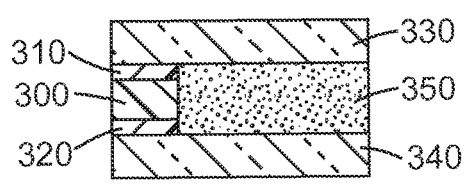
FIG. 3A shows a cross sectional view of a multi-layer optical article according to one embodiment of this disclosure.

FIG. 3A shows an article comprising heat-shrinkable substrate 300 with adhesive layers 310 and 320 disposed on the major surfaces of the heat-shrinkable substrate 300. Adhesive layer 310 is the second adhesive layer described above and adhesive layer 320 is the third adhesive layer described above. Adhesive layers 310 and 320 can be the same or different. First adhesive layer 350 is proximate to heat-shrinkable substrate 300. Adhesive layer 350 may comprise the same material as adhesive layers 310 and/or 320 or it may be different. Optical substrates 330 and 340 are disposed on adhesive layer 350 and adhesives layers 310 and 320 such that the edges of optical substrates 330 and 340 are proximate to the adhesive article comprising heat-shrinkable substrate 300, adhesive layer 310 and adhesive layer 320.

Figure 4A:
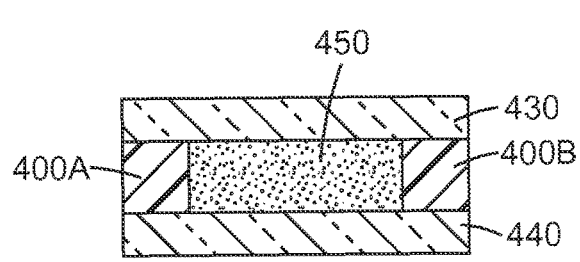
FIG. 4A shows a cross sectional view of a multi-layer optical article according to one embodiment of this disclosure.

In other embodiments, it may be desirable to have more than one heat-shrinkable substrate. FIG. 4A shows an embodiment with heat-shrinkable substrates 400A and 400B proximate to optically clear adhesive layer 450. Optical substrates 430 and 440 are disposed on the optically clear adhesive layer 450, and on heat-shrinkable substrates 400A and 400B such that the edges of the optical substrates 430 and 440 are proximate to heat-shrinkable substrates 400a and 400B.

Figure 5:
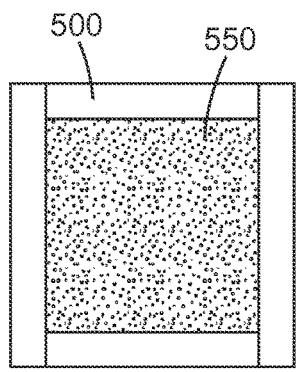
FIG. 5 shows a top view of an optical article according to one embodiment of this disclosure.
Figure 6:
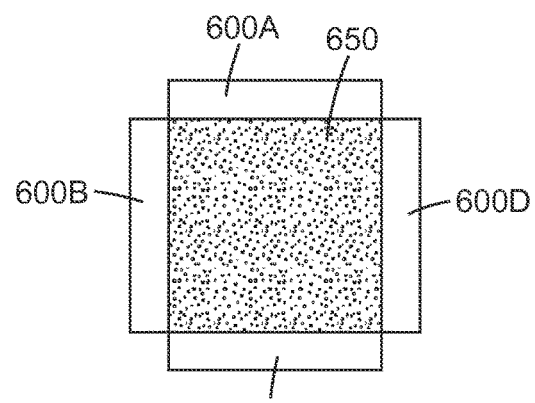
FIG. 6 shows a top view of an optical article according to one embodiment of this disclosure.
Figure 7:
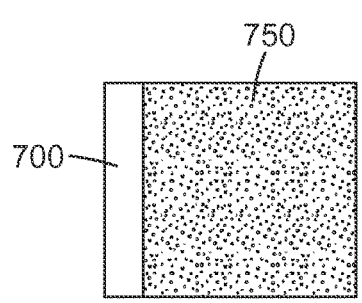
FIG. 7 shows a top view of an optical article according to one embodiment of this disclosure.
Figure 8:
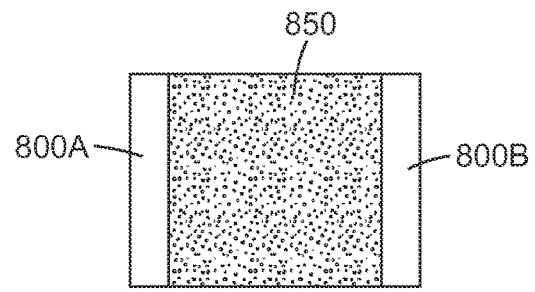
FIG. 8 shows a top view of an optical article according to one embodiment of this disclosure.

FIGS. 5-8 show top views of constructions comprising an optical substrate (not shown) with at least one heat-shrinkable substrate disposed proximate to the edge of the optical substrate and a first optically clear adhesive layer disposed on a majority of the surface area of the optical substrate. In FIG. 5, heat-shrinkable substrate 500 is proximate to the entire perimeter of the optical substrate and completely encompasses adhesive layer 550. In FIG. 6, 4 segments of heat-shrinkable substrate (600A, 600B, 600C, and 600D) are placed proximate to the perimeter of the optical substrate and completely encompass adhesive layer 650. In FIG. 7, heat-shrinkable substrate 700 is located proximate to the edge of the optical substrate and proximate to the adhesive layer 750. In FIG. 8, heat-shrinkable substrates 800A and 800B are located proximate to the edges of the optical substrate and proximate to the adhesive layer 850. A second optical substrate (not shown) can be added to the articles of FIGS. 5-8 to form constructions of this disclosure. Alternatively, the components shown in FIGS. 5-8 describe embodiments of the multi-component adhesive articles (comprising a heat-shrinkable substrate and an proximate adhesive layer) described above.

After the constructions are formed, it may be desirable to de-bond the article. This de-bonding may be carried out immediately after the optical article is formed if it is detected that there is a defect in the optical article. A wide range of defects are possible and the ability to de-bond the article and remake the article can provide major cost and time savings. For example, if one of the optical substrates is the surface of an optical device and the defect is the entrapment of dust or some other contaminant that renders the optical device unusable, a quick de-bonding process and re-bonding to form a new device can prevent expensive components from being scrapped because of the defect.

The de-bonding may occur at a time far distant from the assembling of the multi-layer article, such as for example at the end of service life of the article. It may be desirable at that time to disassemble the article to recycle components, such as glass plates, rather than discarding the entire article.

The method of de-bonding comprises applying heat to the prepared construction sufficient to induce shrinkage in the heat-shrinkable substrate. This shrinkage, as has been described above, generates the shrinkage force that drives the de-bonding. Generally the heat applied is sufficient to generate the threshold shrink force but is not sufficient to degrade or damage other components of the article. The temperature and time at that temperature which are able to generate the threshold shrink force vary with different films. Typically the multi-layer articles are heated to 80 to 150° C. for a time of from 1 to 60 minutes, more typically 1-10 minutes. Generally when polyolefin films are used as the heat-shrinkable optical substrate, the articles are heated to 80 to 120° C. for a time of from 1 to 60 minutes, more typically 1-10 minutes. Generally when polyacrylate films are used as the heat-shrinkable optical substrate, the articles are heated to 100 to 150° C. for a time of from 1 to 60 minutes, more typically 1-10 minutes. However, temperatures and heating times can vary based, for example on the mass of the substrates involved, as well as other factors.

The shrink force causes the failure of the first optically clear adhesive layer, as well as the failure of the second and third adhesive layers, if present. Examples of shrink force failures of constructions are shown in FIGS. 2B-4B.

Figure 2B:
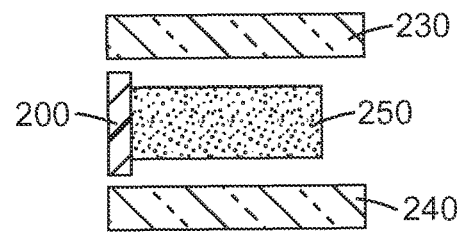
FIG. 2B shows a cross sectional view of the multi-layer optical article of 2A after heat shrinkage.

In FIG. 2B, the heat-shrinkable substrate 200 of FIG. 2A has shrunk and adhesive layer 250 has de-bonded from optical substrates 230 and 240. In FIG. 2B, adhesive layer 250 is shown intact, however it should be understood that adhesive residue may be left on one or both of optical substrates 230 and 240.

Figure 3B:
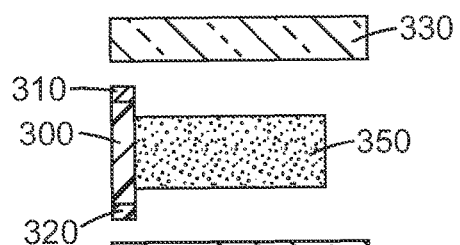
FIG. 3B shows a cross sectional view of the multi-layer optical article of 3A after heat shrinkage.

In FIG. 3B, the heat-shrinkable substrate 300 of FIG. 3A has shrunk, together with adhesive layers 310 and 320, and adhesive layer 350 has de-bonded from optical substrates 330 and 340. In FIG. 3B, adhesive layer 350 is shown intact, however it should be understood that adhesive residue may be left on one or both of optical substrates 330 and 340.

Figure 4B:
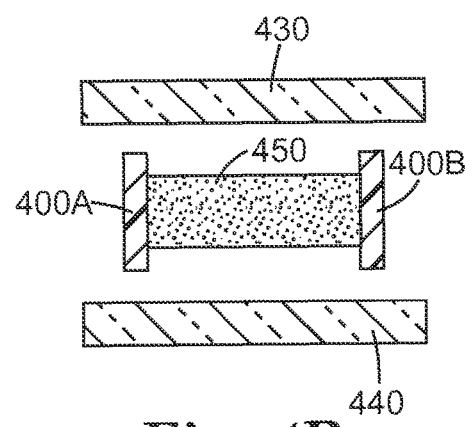
FIG. 4B shows a cross sectional view of the multi-layer optical article of 4A after heat shrinkage.

In FIG. 4B, the heat-shrinkable substrates 400A and 400B of FIG. 4A has shrunk, and adhesive layer 450 has de-bonded from optical substrates 430 and 440. In FIG. 4B, adhesive layer 450 is shown intact, however it should be understood that adhesive residue may be left on one or both of optical substrates 430 and 440.

After heat has been applied to cause the de-bonding, typically the construction is allowed to cool and the de-bonded article can then be disassembled and reusable parts cleaned or otherwise made ready to be reused or recycled. As mentioned previously, because the heat de-bonding mechanism is driven by the shrinkage of the heat-shrinkable substrate, a permanent change is made in the article by heating. This permanent change permits the article to be cooled and disassembled, the article need not be disassembled while hot.

This disclosure includes the following embodiments.

Among the embodiments are optical articles. A first embodiment of an article comprises a first optical substrate with a first major surface, a second major surface, and at least one edge; and an adhesive article disposed between the first optical substrate and the second optical substrate, the adhesive article comprising: a first optically clear adhesive with a first major surface and a second major surface, wherein the first major surface of the first optically clear adhesive is disposed on the second major surface of the first optical substrate such that the first optically clear adhesive is disposed on a majority of the surface area of the second major surface of the first optical substrate, and is disposed on the first major surface of the second optical substrate such that the first optically clear adhesive is disposed on a majority of the surface area of the first major surface of the second optical substrate; and a heat-shrinkable substrate with a first major surface and a second major surface, wherein the heat-shrinkable substrate is proximate to the first optically clear adhesive and also is proximate to the edge of the second major surface of the first optical substrate and wherein the second major surface of the heat-shrinkable substrate is proximate to the edge of the first major surface of the second optical substrate, such that the heat-shrinkable substrate is not disposed on a majority of the surface area of either the first optical substrate or the second optical substrate, and wherein at least part of the heat-shrinkable substrate has a threshold shrink force of at least 100 grams per inch (3.85 N/dm), and the first optically clear adhesive has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising the first optically clear adhesive and the heat-shrinkable substrate.

Embodiment 2 is the article of embodiment 1, further comprising a second adhesive layer between the first major surface of the heat-shrinkable substrate and the second major surface of the first optical substrate and a third adhesive layer between the second major surface of the heat-shrinkable substrate and the first major surface of the second optical substrate, wherein the second and third adhesive layer each has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising the second or third adhesive and the heat-shrinkable substrate.

Embodiment 3 is the article of embodiment 2, wherein at least one of the second adhesive layer and the third adhesive layer is different from the first optically clear adhesive.

Embodiment 4 is the article of embodiment 2 or 3, wherein the second adhesive layer and the third adhesive are the same as the first optically clear adhesive.

Embodiment 5 is the article of any of embodiments 1-4, wherein the heat-shrinkable substrate comprises an optically clear heat-shrinkable substrate.

Embodiment 6 is the article of any of embodiments 1-5, wherein the first optical substrate comprises a rigid or semi-rigid substrate, and the second optical substrate comprises a rigid, semi-rigid, or flexible substrate.

Embodiment 7 is the article of any of embodiments 1-6, wherein both the first optical substrate and the second optical substrate comprise rigid or semi-rigid substrates.

Embodiment 8 is the article of any of embodiments 1-6, wherein the first optical substrate comprises a rigid or semi-rigid substrate and the second optical substrate comprises a flexible substrate.

Embodiment 9 is the article of any of embodiments 1-6, wherein the second optical substrate comprises a semi-rigid substrate with a thickness of from 25-100 micrometers thickness.

Embodiment 10 is the article of any of embodiments 1-9, wherein the first layer of optically clear adhesive comprises a pressure sensitive adhesive.

Embodiment 11 is the article of any of embodiments 1-9, wherein the first layer of optically clear adhesive comprises a gel, a cured adhesive, or a hot melt.

Embodiment 12 is the article of any of embodiments 1-11, wherein the heat-shrinkable substrate comprises a film comprising a polyolefin film, a poly(meth)acrylate film, a polyester film, a polystyrene film, a polycarbonate film, a vinyl film, a cellulose-based film, or a blend film.

Embodiment 13 is the article of any of embodiments 1-12, wherein the heat-shrinkable substrate has an initial area at ambient temperature and shrinks to no greater than 80% of the initial area upon exposure to 150° C. for 30 minutes.

Embodiment 14 is the article of any of embodiments 1-13, wherein the first and second optical substrates each comprise a second edge, and further comprising a second heat-shrinkable substrate with a first major surface and a second major surface, wherein the first major surface of the heat-shrinkable substrate is proximate to the second edge of the second major surface of the first optical substrate and wherein the second major surface of the heat-shrinkable substrate is proximate to the second edge of the first major surface of the second optical substrate.

Embodiment 15 is the article of any of embodiments 1-13, wherein the first and second optical substrates each comprise multiple edges, and further comprising multiple heat-shrinkable substrates with a first major surface and a second major surface, wherein the first major surface of the heat-shrinkable substrates are proximate to the multiple edges of the second major surface of the first optical substrate and wherein the second major surface of the heat-shrinkable substrates are proximate to the multiple edges of the first major surface of the second optical substrate.

Embodiment 16 is the article of embodiment 15, wherein the multiple heat-shrinkable substrates are proximate to the entire perimeter of the optical substrates.

Among the embodiments are methods. Embodiment 16 is a method comprising: preparing a multi-layer article, wherein preparing the multi-layer article comprises: providing a first optical substrate having a first major surface and a second major surface and at least one edge; providing a second optical substrate having a first major surface and a second major surface and at least one edge; forming an adhesive article on the second major surface of the first optical substrate, wherein forming the adhesive article comprises: disposing a heat-shrinkable substrate on the second major surface of the first optical substrate, proximate to the edge of the first optical substrate, wherein the heat-shrinkable substrate has a first major surface and a second major surface and threshold shrink force of at least 100 grams per inch (3.85 N/dm); and disposing a first optically clear adhesive on the majority of the surface area of the second major surface of the first optical substrate and proximate to the heat-shrinkable substrate, such that the first optically clear adhesive forms an adhesive bond to the first optical substrate, and wherein the first optically clear adhesive has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising the second or third adhesive and the heat-shrinkable substrate; and disposing the second optical substrate on the adhesive article such that the edge of the second major substrate is proximate to the second major surface of the heat-shrinkable substrate, and the first optically clear adhesive is disposed on the majority of the surface area of the first major surface of the second optical substrate, such that the first optically clear adhesive forms an adhesive bond to the second optical substrate.

Embodiment 17 is the method of embodiment 16, further comprising a second adhesive layer between the first major surface of the heat-shrinkable substrate and the second major surface of the first optical substrate and a third adhesive layer between the second major surface of the heat-shrinkable substrate and the first major surface of the second optical substrate.

Embodiment 18 is the method of embodiment 16 or 17, wherein at least one of the second adhesive layer and the third adhesive layer is different from the first optically clear adhesive.

Embodiment 19 is the method of embodiment 16 or 17, wherein the second adhesive layer and the third adhesive are the same as the first optically clear adhesive.

Embodiment 20 is the method of any of embodiments 16-19, wherein the heat-shrinkable substrate comprises an optically clear heat-shrinkable substrate.

Embodiment 21 is the method of any of embodiments 16-20, wherein the first optical substrate comprises a rigid or semi-rigid substrate and the second optical substrate comprises a rigid, semi-rigid, or flexible substrate.

Embodiment 22 is the method of any of embodiments 16-21, wherein both the first optical substrate and the second optical substrate comprise rigid or semi-rigid substrates.

Embodiment 23 is the method of any of embodiments 16-22, wherein the first optical substrate comprises a rigid or semi-rigid substrate and the second optical substrate comprises a flexible substrate.

Embodiment 24 is the method of any of embodiments 16-23, wherein the first layer of optically clear adhesive comprises a pressure sensitive adhesive.

Embodiment 25 is the method of any of embodiments 16-23, wherein the first layer of optically clear adhesive comprises a gel, a cured adhesive, or a hot melt.

Embodiment 26 is the method of any of embodiments 16-25, wherein the heat-shrinkable substrate comprises a film comprising a polyolefin film, a poly(meth)acrylate film, a polyester film, a polystyrene film, a polycarbonate film, a vinyl film, a cellulose-based film, or a blend film.

Embodiment 27 is the method of any of embodiments 16-26, wherein the heat-shrinkable substrate has an initial area at ambient temperature and shrinks to no greater than 80% of the initial area upon exposure to 150° C. for 30 minutes.

Embodiment 28 is the method of any of embodiments 16-27, wherein the first and second optical substrates each comprise a second edge, and further comprising a second heat-shrinkable substrate with a first major surface and a second major surface, wherein the first major surface of the heat-shrinkable substrate is proximate to the second edge of the second major surface of the first optical substrate and wherein the second major surface of the heat-shrinkable substrate is proximate to the second edge of the first major surface of the second optical substrate.

Embodiment 29 is the method of any of embodiments 16-27, wherein the first and second optical substrates each comprise multiple edges, and further comprising multiple heat-shrinkable substrates with a first major surface and a second major surface, wherein the first major surface of the heat-shrinkable substrates are proximate to the multiple edges of the second major surface of the first optical substrate and wherein the second major surface of the heat-shrinkable substrates are proximate to the multiple edges of the first major surface of the second optical substrate.

Embodiment 30 is the method of embodiment 29, wherein the multiple heat-shrinkable substrates are proximate to the entire perimeter of the optical substrates.

Embodiment 31 is the method of any of embodiments 16-30, further comprising applying heat to the prepared multi-layer article sufficient to induce shrinkage in the heat-shrinkable substrate.

Embodiment 32 is the method of embodiment 31, wherein the shrinkage causes failure of the adhesive bond of the first optically clear adhesive to the first optical substrate, failure of the adhesive bond of the first optically clear adhesive to the second optical substrate, or failure of both adhesive bonds.

EXAMPLES

These examples are merely for illustrative purposes only and are not meant to be limiting on the scope of the appended claims. All parts, percentages, ratios, etc. in the examples and the rest of the specification are by weight, unless noted otherwise.

Materials:

| Abbreviation | Description |
| --- | --- |
| Shrink Film 1 | Polyolefin Shrink Box Film #1525, 50.8 micrometers thickness, available from Bemis Clysar Films, Oshkosh, WI. |
| Shrink Film 2 | Clear Acrylic PMMA film 0333, 76.2 micrometers thickness, prepared as described in U.S. Pat. No. 4,637,950 |
| Oligomer 1 | Urethane acrylate oligomer commercially available from Sartomer Company, Exton, PA as "CN 9018". |
| Monomer 1 | Alkoxylated neopentyl glycol diacrylate commercially available from Sartomer Company, Exton, PA as "SR9045". |
| Photoinitiator 1 | Photoinitiator commercially available from Ciba/BASF, Hawthorne, NY as "DAROCUR 4265". |
| Transfer PSA 1 | Si-modified optically clear adhesive transfer tape, 25.4 micrometers in thickness, prepared as described in PCT Publication No. WO 2009/105297. |
| Transfer PSA 2 | Optically clear adhesive transfer tape, 8171, 25.4 micrometer thickness, available from 3M Company, St. Paul, MN. |
| Transfer PSA 3 | Adhesive transfer tape, 467MP, 63.6 micrometer thickness, available from 3M Company, St. Paul, MN. |

PSA Formulation Table

| Formulation | Components (initial % by total solids) |
| --- | --- |
| PSA 1 | Oligomer 1/Monomer 1 (75/25) + 1% Photoinitiator 1 |

Test Methods
Shrink Force

Shrink force tests were conducted by adapting the method in ASTM D2838-90 (1980), Procedure A, to be done using a Q800 DMA instrument (TA Instruments, New Castle, Del.) equipped with film tension grips in iso-strain mode. Test specimens with a width of 6.3 mm (0.25 in) were cut from a larger piece of shrink film in an orientation parallel to either the machine direction or the transverse direction. The strips were mounted in the DMA grips with an initial grip separation between 24 mm and 25 mm. Below 30° C., the sample was stretched slightly to a strain level between 0.005% and 0.05%, and that length was maintained as the temperature was increased at a rate of 3° C./min. The force required to maintain the constant length was recorded until the shrink force had passed through a maximum. Tests were conducted with samples from both the machine direction and the transverse direction, and the maximum force observed in those two tests was divided by the width of the test sample to calculate the shrink force. The temperature at which the maximum shrink force was observed was also reported.

Peel Force

90° Peel Adhesion

90° Peel Adhesion tests were conducted by adapting the method in ASTM D3330-90. Adhesive coatings were cut to 2.54 centimeter by 15 centimeter strips. Each strip was then adhered to a 6.2 centimeter by 23 centimeter clean, solvent washed glass panel using a 2-kilogram roller passed once over the strip. The bonded assembly dwelled at room temperature for no less than 10 minutes and no more than 15 minutes. The samples were tested for 90° Peel Adhesion using an IMASS slip/peel tester with a 90° peel testing assembly (Model SP2000, commercially available from Instrumentors Inc., Strongsville, Ohio) at a rate of 2.3 meters/minute (90 inches/minute) over a five second data collection time. Three samples were tested; the reported peel adhesion value is an average of the peel adhesion value from each of the three samples. Data was measured in grams/inch width and converted to Newtons per decimeter (N/dm).

Shrink-Off Test Method

Thermocouple end was attached to the backside of the bottom glass slide of a glass slide sandwich with high temperature tape. The glass slide sandwich was placed on a metal rack to raise off the bench top. Using a conventional heat gun (for example; Master Heat Gun, Model HG301A, Master Appliance Corp., Racine Wis.), heat was applied by slowly moving over the surface of the top glass slide. Heat was applied to the sample until the film in the PSA/Film construction had visibly shrunk enough to separate the two glass sides. The temperature of the backside glass surface was recorded. The construction was cooled sufficiently to handle, and if glass slides separated then the sample was designated as "yes". Glass slides were able to be separated with finger pull only, no prying or wedging with an implement. If sufficient film shrinkage had not occurred to initiate separation of glass slides, and backside glass temperature reached 175° C., the test was terminated. If glass slides could not be separated by fingers alone or backside glass temp exceeded 175° C. without significant film shrinkage, the sample was designated as "no".

EXAMPLES

Shrink Force

The shrink force of the shrink films was determined by following the Shrink Force test procedure and results are shown in Table 1.

TABLE 1

| Shrink Film | Shrink Force (N/dm) | Temp at max shrink (° C.) |
| --- | --- | --- |
| Shrink Film 1 | 16.6 | 99 |
| Shrink Film 2 | 5.33 | 114 |

PSA and Transfer Adhesive Peel Adhesion to Glass Formulation and Sample Preparation The PSA formulation was prepared using the following procedure. Components were added to the mixture in the solids weight percentages specified in the PSA formulation Table. A bottle of the mixture was rolled on a roller mixer for 1 hour. Mixing was done at room temperature.

The resultant mixture was cast onto a Shrink Film (as specified in Table 3) to form a PSA/Film construction. Release liner, PSA formulation, shrink film were placed in a marble top knife coater, which was gapped to yield 25.4 micrometers of coating (dry thickness). The multi-layer construction was pulled under the knife die to spread the PSA formulation to the prescribed thickness on one side of the film. The resulting construction was UV cured with 2 passes at 23 m/min at 100% power using a Fusion F600 high intensity UV lamp (D bulb) from Fusion UV Systems Inc, Gaithersburg.

Samples where the PSA is a transfer tape were made by simple hand lamination of transfer tape to one side of the shrink film.

Failure Force from glass was measured for each sample. PSA/Shrink Film constructions were tested for Failure Force using the 90° Peel Adhesion test method described above. Results are reported in Table 2.

TABLE 2

PSA and Transfer Adhesive Peel Adhesion to Glass

| PSA Description | PSA Thickness (micrometers) | Failure Force (N/dm) |
|---|---|---|
| Transfer PSA 1 | 25.4 | 22.9 |
| PSA 1 | 25.4 | 1.70 |

TABLE 2-continued

PSA and Transfer Adhesive Peel Adhesion to Glass

| PSA Description | PSA Thickness (micrometers) | Failure Force (N/dm) |
|---|---|---|
| Transfer PSA 2 | 25.4 | 46.3 |
| Transfer PSA 3 | 63.6 | 97.3 |

Heat Shrink Examples

Heat separation evaluations were performed with various shrink films at various edges of the sample constructions. PSAs (PSA 1 or Transfer PSAs as listed in Table 3) were laminated to one side of a 50 mm×75 mm×1 mm glass slide. A margin of 3-5 mm was maintained between the PSA and the edge of the glass slide. Note that the thickness of the PSA was matched to the thickness of the Shrink Film plus any adhesive on the Shrink Film. Shrink Films with or without adhesive as listed in Table 3 were cut to 3 mm wide strips. These strips were placed in the margin area on the glass slide. When only one or two strips were applied, they were cut to 50 mm in length and placed on the shorter side of the glass slides. The number of edges containing a strip of Shrink Film in the margins is listed in Table 3. As noted in Table 3 some examples used Shrink Film 1 that was segmented into 3 mm×3 mm squares as described in U.S. provisional application 61/509,250. Laminated onto the top of the assembly was a second 50 mm×75 mm×1 mm glass slide. Shrink-Off tests were carried out using the test method described above. The results are shown in Table 3.

TABLE 3

PSA to Glass Failure Examples

| Shrink Film Type | Shrink Film Adhesive | Number of edges with Shrink Film in the margin | PSA Description | PSA Thickness (micrometers) | Separated Glass | Back Side Temp (° C.) |
|---|---|---|---|---|---|---|
| Shrink Film 1 | None | 1 | Transfer PSA 1 | 50.8 | No | 175 |
| Shrink Film 1 | None | 4 | Transfer PSA 1 | 50.8 | No | 175 |
| Shrink Film 1 | None | 1 | PSA 1 | 50.8 | Yes | 100 |
| Shrink Film 1 | None | 2 | PSA 1 | 50.8 | Yes | 100 |
| Shrink Film 1 | None | 4 | PSA 1 | 50.8 | Yes | 100 |
| Shrink Film 1 | PSA 1 on one side | 1 | PSA 1 | 76.2 | No | 175 |
| Shrink Film 1 | PSA 1 on one side | 2 | PSA 1 | 76.2 | Yes | 105 |
| Shrink Film 1 | PSA 1 on one side | 4 | PSA 1 | 76.2 | Yes | 105 |
| Shrink Film 1 | PSA 1 on both sides | 1 | PSA 1 | 102 | Yes | 105 |
| Shrink Film 1 | PSA 1 on both sides | 2 | PSA 1 | 102 | Yes | 105 |
| Shrink Film 1 | PSA 1 on both sides | 4 | PSA 1 | 102 | Yes | 105 |
| Shrink Film 2 | None | 1 | Transfer PSA 1 | 76.2 | No | 175 |
| Shrink Film 2 | None | 2 | Transfer PSA 1 | 76.2 | No | 175 |
| Shrink Film 2 | None | 4 | Transfer PSA 1 | 76.2 | Yes | 110 |
| Shrink Film 2 | Transfer PSA 1 on one side | 1 | Transfer PSA 1 | 102 | No | 175 |
| Shrink Film 2 | Transfer PSA 1 on one side | 2 | Transfer PSA 1 | 102 | No | 175 |
| Shrink Film 2 | Transfer PSA 1 on one side | 4 | Transfer PSA 1 | 102 | No | 175 |

TABLE 3-continued

PSA to Glass Failure Examples

| Shrink Film Type | Shrink Film Adhesive | Number of edges with Shrink Film in the margin | PSA Description | PSA Thickness (micrometers) | Separated Glass | Back Side Temp (° C.) |
|---|---|---|---|---|---|---|
| Shrink Film 2 | Transfer PSA 1 on both sides | 1 | Transfer PSA 1 | 127 | No | 175 |
| Shrink Film 2 | Transfer PSA 1 on both sides | 2 | Transfer PSA 1 | 127 | No | 175 |
| Shrink Film 2 | Transfer PSA 1 on both sides | 4 | Transfer PSA 1 | 127 | No | 175 |
| Shrink Film 2 | None | 4 | Transfer PSA 2 | 76.2 | No | 175 |
| Shrink Film 2 | None | 1 | PSA 1 | 76.2 | Yes | 105 |
| Shrink Film 2 | None | 2 | PSA 1 | 76.2 | Yes | 110 |
| Shrink Film 2 | None | 4 | PSA 1 | 76.2 | Yes | 110 |
| Shrink Film 2 | PSA 1 on one side | 1 | PSA 1 | 102 | Yes | 110 |
| Shrink Film 2 | PSA 1 on one side | 2 | PSA 1 | 102 | Yes | 115 |
| Shrink Film 2 | PSA 1 on one side | 4 | PSA 1 | 102 | Yes | 115 |
| Shrink Film 2 | PSA 1 on both sides | 1 | PSA 1 | 127 | Yes | 120 |
| Shrink Film 2 | PSA 1 on both sides | 2 | PSA 1 | 127 | Yes | 120 |
| Shrink Film 2 | PSA 1 on both sides | 4 | PSA 1 | 127 | Yes | 120 |
| Shrink Film 2 | PSA 1 on both sides | 1 | Transfer PSA 1 | 127 | No | 175 |
| Shrink Film 2 | PSA 1 on both sides | 2 | Transfer PSA 1 | 127 | No | 175 |
| Shrink Film 2 | PSA 1 on both sides | 4 | Transfer PSA 1 | 127 | Yes | 120 |
| Shrink Film 1 Segmented | Transfer PSA 3 on both sides | 1 | Transfer PSA 1 | 178 | No | 175 |
| Shrink Film 1 Segmented | Transfer PSA 3 on both sides | 2 | Transfer PSA 1 | 178 | No | 175 |
| Shrink Film 1 Segmented | Transfer PSA 3 on both sides | 4 | Transfer PSA 1 | 178 | No | 175 |
| Shrink Film 1 Segmented | Transfer PSA 3 on both sides | 1 | PSA 1 | 178 | Yes | 95 |
| Shrink Film 1 Segmented | Transfer PSA 3 on both sides | 2 | PSA 1 | 178 | Yes | 95 |
| Shrink Film 1 Segmented | Transfer PSA 3 on both sides | 4 | PSA 1 | 178 | Yes | 95 |

What is claimed is:

1. An article comprising:
a first optical substrate with a first major surface, a second major surface, and at least one edge;
a second optical substrate with a first major surface and a second major surface and at least one edge; and
an adhesive article disposed between the first optical substrate and the second optical substrate, the adhesive article comprising:
a first optically clear adhesive with a first major surface and a second major surface, wherein the first major surface of the first optically clear adhesive is disposed on the second major surface of the first optical substrate such that the first optically clear adhesive is disposed on a majority of the surface area of the second major surface of the first optical substrate, and is disposed on the first major surface of the second optical substrate such that the first optically clear adhesive is disposed on a majority of the surface area of the first major surface of the second optical substrate; and
a heat-shrinkable substrate with a first major surface and a second major surface, wherein the heat-shrinkable substrate is proximate to the first optically clear adhesive and also is proximate to the edge of the second major surface of the first optical substrate and wherein the second major surface of the heat-shrinkable substrate is proximate to the edge of the first major surface of the second optical substrate, such that the heat-shrinkable substrate is not disposed on a majority of the surface area of either the first optically clear substrate or the second optical substrate, and wherein at least part of the heat-shrinkable substrate has a threshold shrink force of at least 100 grams per inch (3.85 N/dm), and the first optically clear adhesive has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising the first optically clear adhesive and the heat-shrinkable substrate.

2. The article of claim 1, further comprising a second adhesive disposed between the first major surface of the heat-shrinkable substrate and the second major surface of the first optical substrate and a third adhesive disposed between the second major surface of the heat-shrinkable substrate and the first major surface of the second optical substrate, wherein the second and third adhesive each has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising the second or third adhesive and the heat-shrinkable substrate.

3. The article of claim 1, wherein the first optical substrate comprises a rigid or semi-rigid substrate and the second optical substrate comprises a rigid, semi-rigid, or flexible substrate.

4. The article of claim 3, wherein the first optical substrate comprises a semi-rigid substrate with a thickness of from 25-100 micrometers.

5. The article of claim 1, wherein the first optically clear adhesive comprises a pressure sensitive adhesive.

6. The article of claim 1, wherein the first optically clear adhesive comprises a gel, or a cured adhesive.

7. The article of claim 1, wherein the heat-shrinkable substrate comprises a film comprising a polyolefin film, a poly(meth)acrylate film, a polyester film, a polystyrene film, a polycarbonate film, a vinyl film, a cellulose-based film, or a blend film.

8. The article of claim 1, wherein the first and second optical substrates each comprise a second edge, and the adhesive article further comprises a second heat-shrinkable substrate with a first major surface and a second major surface proximate to the first optically clear adhesive, wherein the first major surface of the second heat-shrinkable substrate is proximate to the second edge of the second major surface of the first optical substrate and wherein the second major surface of the heat-shrinkable substrate is proximate to the second edge of the first major surface of the second optical substrate.

9. The article of claim 1, wherein the first and second optical substrates each comprise multiple edges, and wherein the adhesive article further comprises multiple heat-shrinkable substrates proximate to the first optically clear adhesive and wherein each heat-shrinkable substrate is proximate to an edge of the first and second optical substrate.

10. The article of claim 9, wherein the multiple heat-shrinkable substrates are proximate to the entire perimeter of the optical substrates.

11. A method comprising:
preparing a multi-layer article, wherein preparing the multi-layer article comprises:
providing a first optical substrate having a first major surface and a second major surface and at least one edge;
providing a second optical substrate having a first major surface and a second major surface and at least one edge;
forming an adhesive article on the second major surface of the first optically clear substrate, wherein forming the adhesive article comprises:
disposing a heat-shrinkable substrate on the second major surface of the first optical substrate, proximate to the edge of the first optically clear substrate, wherein the heat-shrinkable substrate has a first major surface and a second major surface and threshold shrink force of at least 100 grams per inch (3.85 N/dm); and
disposing a first optically clear adhesive on the majority of the surface area of the second major surface of the first optical substrate and proximate to the heat-shrinkable substrate, such that the first optically clear adhesive forms an adhesive bond to the first optical substrate, and wherein the first optically clear adhesive has a Failure Force of from 0.1 to 85 grams per inch (0.039-3.3 N/dm), where the Failure Force is determined by measuring either the 90° Peel Adhesion at room temperature or the 180° Peel Adhesion at 100° C. to a glass substrate of an article comprising the second or third adhesive and the heat-shrinkable substrate; and
disposing the second optical substrate on the adhesive article such that the edge of the second major substrate is proximate to the second major surface of the heat-shrinkable substrate, and the first optically clear adhesive is disposed on the majority of the surface area of the first major surface of the second optical substrate, such that the first optically clear adhesive forms an adhesive bond to the second optical substrate.

12. The method of claim 11, wherein the heat-shrinkable substrate further comprises a second adhesive disposed on the first major surface of the heat-shrinkable substrate and a third adhesive layer disposed on the second major surface of the heat-shrinkable substrate.

13. The method of claim 11, wherein the first optical substrate comprises a rigid or semi-rigid substrate and the second optical substrate comprises a rigid, semi-rigid, or flexible substrate.

14. The method of claim 11, wherein the first optically clear adhesive comprises a pressure sensitive adhesive.

15. The method of claim 11, wherein the first optically clear adhesive comprises a gel, or a cured adhesive.

16. The method of claim 11, wherein the heat-shrinkable substrate comprises a film comprising a polyolefin film, a poly(meth)acrylate film, a polyester film, a polystyrene film, a polycarbonate film, a vinyl film, a cellulose-based film, or a blend film.

17. The method of claim 11, wherein the first and second optical substrates each comprise a second edge, and wherein forming the adhesive article further comprises disposing a second heat-shrinkable substrate proximate to the first optically clear adhesive and also proximate to the second edge of the second major surface of the first optical substrate and further comprising disposing the second edge of the second optical substrate proximate to the second heat-shrinkable substrate.

18. The method of claim 11, wherein the first and second optical substrates each comprise multiple edges, and wherein forming the adhesive article comprises disposing multiple heat-shrinkable substrates on the second major surface of the first optical substrate such that each heat-shrinkable substrate is proximate to the first optically clear adhesive and also proximate to an edge of the first optical substrate, and further comprising disposing the multiple edges of the second optical substrate such that each edge is proximate to a heat-shrinkable substrate.

19. The method of claim 18, wherein the multiple heat-shrinkable substrates are proximate to the entire perimeter of the optical substrates.

20. The method of claim 11, further comprising applying heat to the prepared multi-layer article sufficient to induce shrinkage in the heat-shrinkable substrate.

21. The method of claim 20, wherein the shrinkage causes failure of the adhesive bond of the first optically clear adhesive to the first optical substrate, failure of the adhesive bond of the first optically clear adhesive to the second optical substrate, or failure of both adhesive bonds.

* * * * *

UNITED STATES PATENT AND TRADEMARK OFFICE
CERTIFICATE OF CORRECTION

PATENT NO. : 9,827,739 B2
APPLICATION NO. : 14/416852
DATED : November 28, 2017
INVENTOR(S) : Rule et al.

It is certified that error appears in the above-identified patent and that said Letters Patent is hereby corrected as shown below:

In the Specification

Column 1
Line 9, delete "61/675880," and insert -- 61/675,880, --, therefor.

Column 7
Line 14-15, delete "calorimetry" and insert -- Calorimetry --, therefor.
Line 57-58, delete "poloxyyalkylenes" and insert -- polyoxyalkylenes --, therefor.
Line 59, delete "—$CH_2CH_2(OCH_2CH_2)$—$OCH_2CH_2$—." and insert
-- $CH_2CH_2(OCH_2CH_2)_nOCH_2CH_2$—. --, therefor.

Column 9
Line 8, after "application" insert -- Attorney Docket No. 69733US002 --.

Column 10
Line 37, delete "and or" and insert -- and/or --, therefor.

Column 15
Line 56, delete "determined" and insert -- determined. --, therefor.

Column 17
Line 41-42, delete "organopolysiloxanepoyurea" and insert -- organopolysiloxanepolyurea --, therefor.

Column 19
Line 44, delete "propianate" and insert -- propionate --, therefor.

Column 20
Line 51, delete "terpentine" and insert -- turpentine --, therefor.

Column 21

Signed and Sealed this
Second Day of April, 2019

Andrei Iancu
*Director of the United States Patent and Trademark Office*

Line 1, delete "Lydondell" and insert -- Lyondell --, therefor.
Line 7, delete "LDTP"," and insert -- LTDP", --, therefor.
Line 60, delete "poly(l-alkene)" and insert -- poly( 1-alkene) --, therefor.

Column 30
Line 36 (approx.), delete "400a" and insert -- 400A --, therefor.